United States Patent
Derby et al.

(10) Patent No.: US 10,069,689 B1
(45) Date of Patent: Sep. 4, 2018

(54) CACHE BASED ON DYNAMIC DEVICE CLUSTERING

(71) Applicant: Amazon Technologies, Inc., Seattle, WA (US)

(72) Inventors: Justin Jon Derby, Seattle, WA (US); Andrew Kenneth Milton, Bellevue, WA (US); Faizal Sultanali Kassamali, Bellevue, WA (US); Massimo Ramella-Pezza, Seattle, WA (US); Richard Christopher Green, Bothell, WA (US); Adib Roumani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 14/975,591

(22) Filed: Dec. 18, 2015

(51) Int. Cl.
    *G06F 15/173* (2006.01)
    *H04L 12/24* (2006.01)
    *H04L 29/08* (2006.01)

(52) U.S. Cl.
    CPC .............. *H04L 41/12* (2013.01); *H04L 67/16* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 7,287,180 B1 * | 10/2007 | Chen | ................... | G06F 11/2033 714/11 |
| 9,077,580 B1 * | 7/2015 | Randhawa | .............. | H04L 29/06 |
| 2006/0165012 A1 * | 7/2006 | Habetha | .............. | H04L 41/0806 370/254 |
| 2008/0247310 A1 * | 10/2008 | Ruffini | .................... | H04L 41/12 370/230 |
| 2008/0253286 A1 * | 10/2008 | Shriram | ................ | H04L 41/147 370/232 |
| 2010/0046363 A1 * | 2/2010 | Shenoy | ................. | H04W 84/20 370/216 |
| 2010/0162036 A1 * | 6/2010 | Linden | .................. | G06F 11/181 714/4.11 |
| 2015/0023213 A1 * | 1/2015 | Soneda | ................. | H04W 40/32 370/254 |
| 2016/0021526 A1 * | 1/2016 | Niu | .................... | H04W 72/0413 370/230 |

* cited by examiner

*Primary Examiner* — Brian Whipple
(74) *Attorney, Agent, or Firm* — Knobbe Martens Olson & Bear, LLP

(57) ABSTRACT

Systems and methods are provided for increasing the overall network performance experienced by a group of devices by forming a dynamic and collaborative cluster of computing devices. In particular, the computing devices within the cluster collectively may identify and leverage the current capabilities of each of the individual members of the cluster to respond efficiently to network resource requests from computing devices inside or outside the cluster. As such, various embodiments provide for a dynamic cluster of computing devices that tailor the responsibilities of the members of the cluster to the current capabilities, capacities, and state of these computing devices. In particular, devices in the cluster may participate dynamically in the cluster to ensure that a device in the cluster that is currently most suited to performing a task is the device selected to perform that task.

30 Claims, 9 Drawing Sheets

CACHE BASED ON DYNAMIC DEVICE CLUSTERING

BACKGROUND

Generally described, computing devices and communication networks can be utilized to exchange information. In a common application, a computing device can request content from another computing device via the communication network. In accordance with a simple example, users associated with a personal computing device can utilize a software browser application to request a Web page from a server computing device via the Internet. In such embodiments, the user computing device can be referred to as a client computing device and the server computing device can be referred to as a content provider.

In more complex embodiments, users can utilize multiple electronic computing devices, such as laptop computers, tablets, smart phones, and desktop computer, to access resources hosted on network resource providers. For example, a user may utilize a smart phone to download emails from an email server, while at the same time, retrieving web resources from a website via a browser application via a laptop computer. In some embodiments, such multiple computing devices may utilize a common network communication path to obtain resources from the network. Such sharing of a network communication path by multiple computing devices may result in network congestion and an overall degraded user experience.

Content providers are generally motivated to provide requested content to client computing devices often with consideration of efficient transmission of the requested content to the client computing device and consideration of a cost associated with the transmission of the content. Still further for larger scale implementations, content providers may receive content requests from a high volume of client computing devices, which can place additional strain on content provider computing resources and communication network resources.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
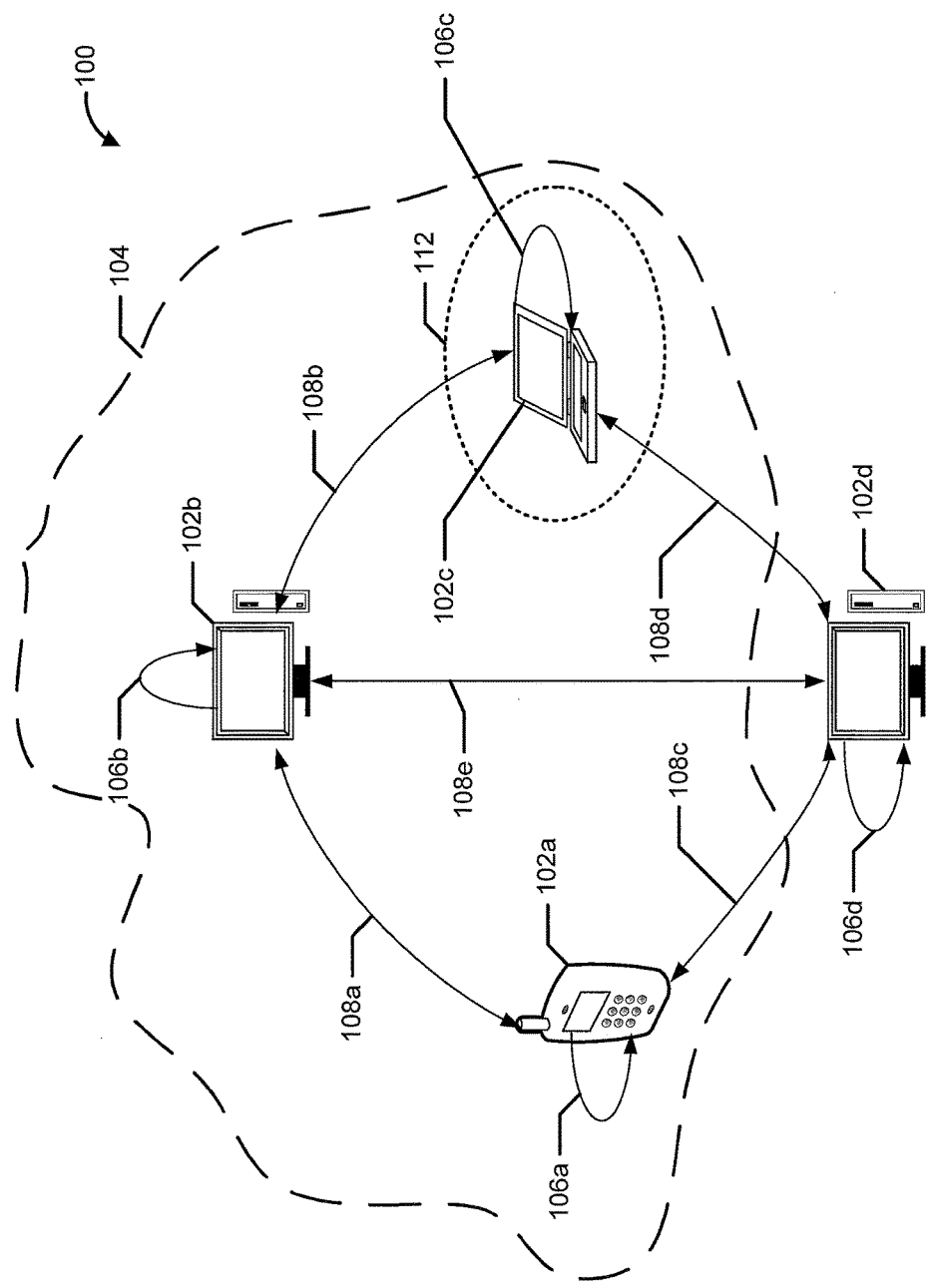
FIG. 1A is a system block diagram of a configuration of a cluster of computing devices, according to some embodiments.

As noted above, in many instances, several computing devices may utilize the same network communication path and may compete with each other for use of limited bandwidth. As a result, heavy use of one or more of these devices to access content over the shared network connection may result in network congestion. Typically, network congestion can result in delayed transmission of data between to and from client computing devices. For example, a user's laptop sharing a network connection with another video streaming device may load web pages of a web site slowly while the television streams video content due to heavy bandwidth of streaming video.

In some embodiments, a group of computing devices (e.g., two or more of the user's computing devices) may exchange communications to respond to requests for network resources as a cluster of devices. Particularly, computing devices within the cluster may maintain copies of identifiable network resources in accessible storage. Accordingly, other computing devices associated with the cluster of devices may obtain a requested network resource without requiring the processing of resource request from the content provider. However, these implementations are typically inflexible and do not consider the current state of the devices in the cluster. Additionally, these implementations do not adjust to changes in the states or current operations of the computing devices in the cluster. These solutions further do not compensate for the addition of new computing devices in the cluster or departures of existing members from the cluster.

In overview, aspects of the present disclosure include systems and methods for providing network resources to a cluster of computing devices. Illustratively, a cluster of computing devices can include two or more computing devices that are configured to share information regarding their current states, capacities, capabilities, and the like. In particular, the computing devices within the cluster of computing devices collectively identify and leverage the current capabilities of each of the individual members of the cluster to provide access to requested network resources. Additionally, in some embodiments, rather than having the cluster of computing devices that statically respond to requests for network resources, various embodiments provide for a computing devices that dynamically tailor the responsibilities of the members of the cluster to the current capabilities, capacities, and state of these computing devices. In particular, according to various embodiments, devices in the cluster may participate dynamically in the cluster to ensure that a device in the cluster that is currently most suited to performing a task is the device selected to perform that task, as further described herein.

Generally described, the various properties, characteristics, and capabilities of a computing device may sometimes be referred to generally as the computing device's "participation characteristics." In turn, the participation characteristics of the computing device in an identified cluster of computing devices may be evaluated in order to determine the extent to which the computing device may contribute or otherwise participate in the operations of the cluster of devices.

By way of a non-limiting example, the participation characteristics of a computing device may be related to the device's data storage capabilities, such as the amount of space or memory that the computing has available to store network resources. In another non-limiting example, participation characteristics of a computing device may include information related to hardware capabilities of the computing device, a cluster enrollment policy of the respective computing device, an access control policy of the respective computing device, or an amount of available caching storage on the respective computing device. In still further non-limiting examples, participation characteristics of a computing device can include an available network bandwidth of the respective computing device, an amount of available processing resources the respective computing device, information regarding applications executing or available for execution on the respective computing device, information regarding user engagement of the respective computing device, a schedule of future operations that the respective computing device will perform, a history of operations that the respective computing device previously performed, or a history of user interaction with the respective computing device. Further, in some embodiments, participation characteristics may also, or alternatively, include information or characteristics related to sensors or sensor measurements of the computing device, such as a heat sensor or internal temperature readings. Illustratively, the participation characteristics may be considered as individual criterion. Additionally, the participation characteristics may be combined in various ways.

To facilitate the availability of resources, computing devices within a defined cluster can be associated with a "participation responsibility." Generally described, participation responsibility can relate generally to an action or operation performed by a computing device within the computing device on behalf of the cluster of computing device or on behalf of another computing device. In some non-limiting examples, participation responsibilities may include retrieving requested resources having a predetermined format from a resource provider, caching an amount of resources, caching resources having a predetermined format, monitoring for changes of participation characteristics of one or more other computing devices of the cluster of computing devices, responding to resource requests from a requesting computing device, determining whether to permit a new computing device to join the cluster of computing devices, determining whether to dismiss a computing device from the cluster of computing devices, or determining a redistribution of cached resources among the cluster of computing devices. Additionally, the participation responsibility can include singular actions or various combinations of actions.

In some embodiments, a computing device may dynamically form a cluster of computing devices with one or more other computing devices. The computing device may initially determine whether to join an existing cluster or form a cluster of computing devices. Particularly, the computing device may determine/identify its current participation characteristics in order to determine whether it is able (or desirable) to join or form a cluster of computing devices. For example, the computing device may determine its current resource availability (e.g., available processing, memory, or networking resources). Based on the current resource availability, the computing device can determine whether responding to network resource requests or caching network resources on behalf of one or more other computing devices would negatively impact its performance beyond an acceptable level. In some embodiments, the computing device may determine that it is available to participate in the cluster of computing devices when its user is not using the computing device or when the user is only lightly using the computing device. In other embodiments, the computing device may determine not to participate in the event that the computing device is experiencing high resource utilization or if the computing device determines that high resources utilization may occur in a future time frame. In some embodiments, in the event that the computing device determines not to join or form the cluster of computing devices, the computing device may assess its participation characteristics at a later time and may make a subsequent decision to join a cluster of computing devices based on its participation characteristics at that later time.

In response to determining to join an existing cluster of computing device or form a cluster of computing device, the computing device may discover one or more other computing devices within the cluster. As part of a discovery process, the computing device and the one or more other computing devices of the cluster may exchange their respective participation characteristics. The participation characteristics of the one or more other computing devices may inform the computing device of their capabilities and ability to participate in the cluster. Once the computing device and the one or more other computing devices have exchanged their participation characteristics, they may collectively appoint or elect a device from among themselves to serve as the manager or decision-maker of the cluster. In some embodiments, the computing devices within the cluster of computing devices may elect or appoint a manager computing device based on the participation characteristics of the manager computing device in comparison to the participation characteristics of the other devices in the cluster. In such embodiments, the participation characteristics of the manager computing device may indicate that the manager computing device is particularly suited to making decisions for the cluster. For example, the manager computing device may not currently be in use by the user and, as such, may have a relatively large amount of available processing resources. In some embodiments, the cluster of computing devices may dynamically elect or appoint a new manager computing device based on changes to the participation characteristics of the former manager computing device (e.g., a reduced ability to manage or a departure from the cluster) or based on change to participation characteristics of another member of the cluster (e.g., an increased ability to manage).

In some embodiments, the cluster of computing devices may collectively serve as a network proxy by receiving and responding to network resource requests from other computing devices. Because each of the devices in the cluster shares its capabilities and ability to participate with the other devices in the cluster, the designated manager computing device of the cluster may efficiently respond to these resource requests by identifying one or more computing devices within the cluster that will be selected to obtain the requested network resource and may cause those one or more identified computing devices to retrieve and provide the request network resource to the requesting device from a network resource provider.

In some embodiments, the manager computing device of the cluster may dynamically manage the network resources that are cached or stored on devices in the cluster by identifying one or more devices in the cluster that are selected to store those resources and by causing resources to be stored on those one or more identified devices. In such embodiments, the manager computing device may quickly respond to a request for a network resource from a requesting computing device by determining that the requested network resource is cached on a computing device in the cluster and by causing that computing device to provide the requested network resource quickly to the requesting device without obtaining the resource from the network.

The manager computing device may, in some embodiments, adjust the participation responsibilities of a computing device within the cluster of computing devices based on changes to that computing device's participation characteristics. For example, in response to determining that a computing device has increased its available memory, the manager computing device may transfer cached resources from one or more other computing devices in the cluster to that computing device. As such, the manager computing device may dynamically allocate responsibilities and other operations within the cluster based on up-to-date or current participation characteristics of each of the computing devices with in the cluster. In such embodiments, the manager computing device may synchronously poll each of the devices in the cluster to determine their current participation characteristics. Alternatively or additionally, computing devices within the cluster transmit updated participation characteristics by reporting changes in their respective participation characteristics to the manager computing device asynchronously. In some embodiments, the manager computing device of the cluster may similarly allocate (or reallocate) participation responsibilities in response to determining that a new computing device has joined the cluster or that an existing member of the cluster has left the cluster.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

FIG. 1A illustrates a system 100 suitable for implementing aspects of the present disclosure. Specifically, the system 100 may include individual computing devices 102a-d. Those skilled in the art will recognize that the computing devices 102a-d may be any of a number of computing devices that are capable of communicating with another computing device. Such computing devices may include, but are not limited to, laptop computers, personal computers, personal digital assistants (PDA), hybrid PDAs/mobile phones, mobile phones, smartphones, wearable computing devices, electronic book readers, digital media players, tablet computer, gaming console or controller, kiosk, augmented reality devices, other wireless devices, set-top or other television boxes, and the like. For ease of description, system 100 is illustrated as including four computing devices 102a-d. However, the system 100 may include two or more computing devices or various combinations thereof.

In the example illustrated in FIG. 1A, the computing devices 102a-d may be in communication with each other, such as via communication links 108a-e, which may be wired or wireless communication links. For instance, the computing devices 102a-d may be in communication with each other via one or more of an Ethernet cable, Bluetooth®, Wi-Fi, or various other known wired or wireless communication protocols that may be suitable for exchanging information, messages, or instructions between the computing devices 102a-d. Each of the computing devices 102a-d may be in communication with each of the other computing devices 102a-d either via a direct communication link or via an indirect communication link through another communication link. As illustrated in FIG. 1A, the computing device 102a may be in direct communication with computing devices 102b and 102d via direct communication links 108a and 108c, respectively. The computing device 102a may also be in indirect communication with the computing device 102c via the computing device 102b or 102d through either communication link 108b or 108d. In some embodiments, instructions, information, or other communications may be exchanged between the computing devices 102a-d through a common application program interface ("API") or an application or service executing on each of the computing devices 102a-d, such as a cluster participation service (e.g., as described with reference to FIG. 2).

Figure 2:
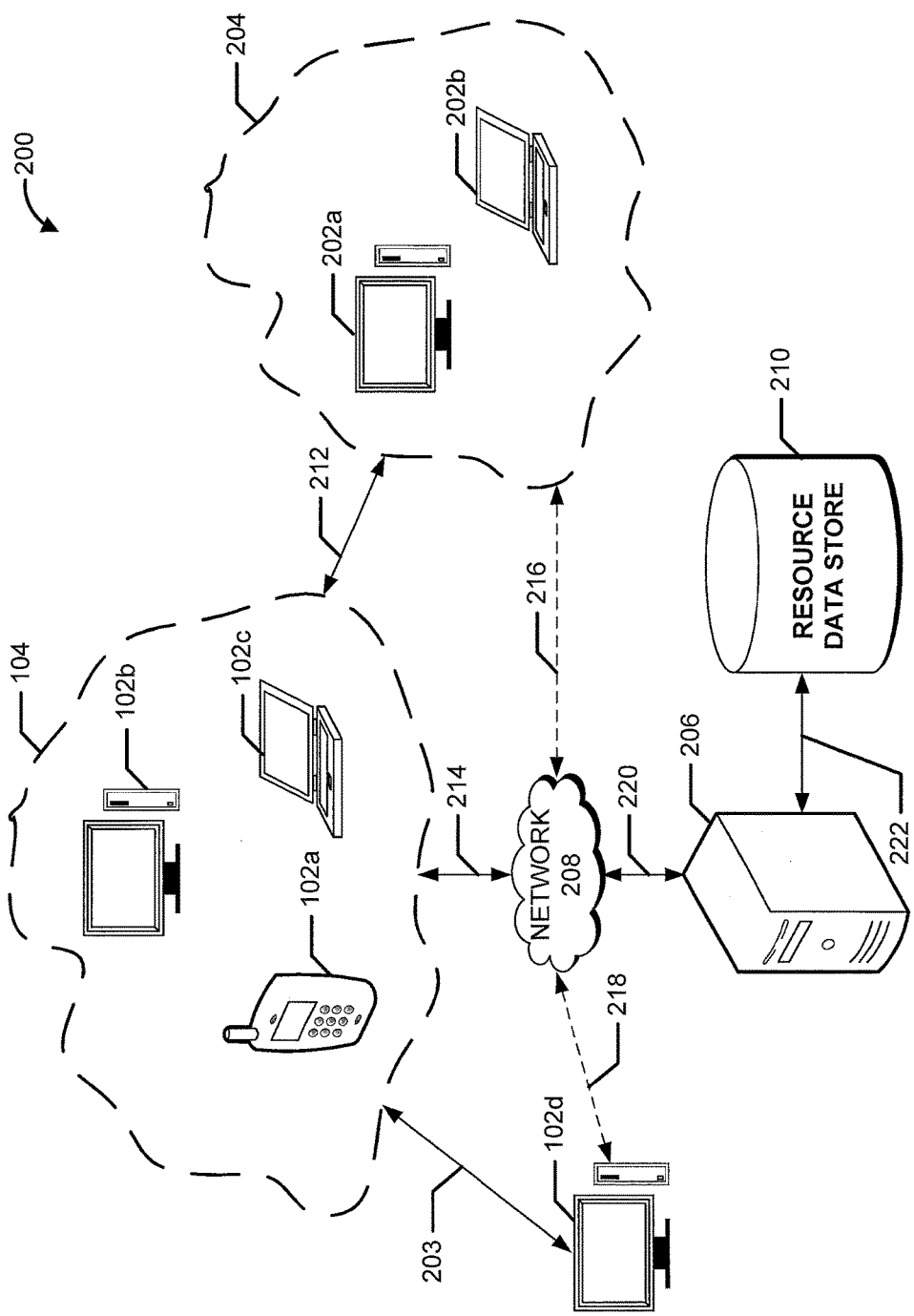
FIG. 2 is a communication system block diagram of a network suitable for use with some embodiments.

Some, but not necessarily all, of the computing devices 102a-102d may be configured to communicate over aspects of the communication network and may be capable of requesting resources from network resource providers (see, e.g., network resource provider 206 of FIG. 2). In a non-limiting example, the computing device 102a may be a smartphone configured with a browser application that enables a user to request media content from a website server (not shown), the computing device 102b may be a desktop computing device capable of streaming video content received from a network content provider (not shown), the computing device 102c may be a laptop computer configured to download emails from a messaging server (not shown), and the computing device 102b may be another desktop computing device configured with a music streaming application that obtains audio data from an network audio provider (not shown).

The computing devices 102a-d may form a dynamic cluster of devices in order to increase the overall efficiency of obtaining and caching network resources. In some embodiments, two or more computing devices may form a cluster of devices by determining their respective participation characteristics, determining whether to participate in a cluster based on their respective participation characteristics, and sharing their respective participation characteristics with each other in response to determining to participate in a cluster of computing devices. For instance, in the example illustrated in FIG. 1A, each of the computing devices 102a-102d may determine their respective participation characteristics by performing operations 106a-106d. In some embodiments, as noted above, participation characteristics of a computing device may relate to various aspects of the computing device and may be relevant to determining the extent to which the computing device is currently able to participate in a cluster of computing devices. In a non-limiting example, the computing device 102a may determine its current participation characteristics in operation 106a by determining its hardware profile (e.g., hardware components or capabilities included in the computing device 102a), an amount of space or memory that is available on the computing device 102a, the current operations of the computing device 102a—such as the applications currently executing on the device—the networks to which the computing device 102a has access, the current network bandwidth usage of the computing device 102a, and the like.

Upon determining their respective participation characteristics, each of the computing devices 102a-d may independently make a determination regarding whether to participate in a cluster of devices based on their respective participation characteristics. For instance, the computing devices 102*a*-*c* may individually determine to participate in a cluster based on their current, respective participation characteristics, and the participation characteristics of each of the computing devices 102*a*-*c* may respectively indicate that the computing devices 102*a*-*c* are currently able to cache, process, and/or retrieve network resource on behalf of other computing devices without negatively affecting, or by only minimally affecting, their own performance. Further, in the example illustrated in FIG. 1A, the computing device 102*d* may determine not to participate in a cluster of devices in response to determining its participation characteristics as a result of performing the operations 106*d*. For example, the computing device 102*d* may be streaming ultra-high definition video (e.g., 4K video) and, as a result, the computing device 102*d* may be unable to obtain network resources on behalf of other computing devices without degrading the quality of the streaming video. However, while the computing device 102*d* has determined not to participate in the cluster of computing devices based on its current participation characteristics, participation in a cluster may be dynamic such that computing devices may drop in or drop out of the cluster based on their current participation characteristics (e.g., as further described with reference to FIG. 1B).

In the example illustrated in FIG. 1A, computing devices 102*a*-102*c* may determine to join or form a cluster of computing devices 104 based on their respective participation characteristics and, optionally, also based on the participation characteristics of the other computing devices. In some embodiments, each of the computing devices 102*a*-102*c* may share their respective participation characteristics with each of the other computing devices 102*a*-102*c*. As such, each of the computing devices 102*a*-102*c* may be aware of their respective participation characteristics, as well as the participation characteristics of each of the other computing devices 102*a*-102*c* in the cluster of computing devices 104.

In some embodiments, the computing devices 102*a*-102*c* in the cluster of computing devices 104 may analyze the participation characteristics of each of the devices in the cluster 104 in order to elect or appoint one of the computing devices 102*a*-102*c* as the manager or decision maker for the cluster of computing devices 104. In the example illustrated in FIG. 1A, the computing devices 102*a*-102*c* may elect the computing device 102*c* as the manager computing device, as indicated by the indicator 112. In some embodiments, the computing devices 102*a*-102*c* may elect or appoint the computing device 102*c* as the manager of the cluster of computing devices 104 based on one or more aspects—or combinations of aspects—of the participation characteristics of the computing device 102*c*, such as the relative amount of processing power available on the manager computing device, the extent to which the manager computing device is in communication with other computing devices in the cluster (e.g., more direct communication links than indirect communication links), and various other criteria.

In some embodiments, as the manager of the cluster of computing devices 104, the computing device 102*c* may dynamically assign participation responsibilities to each of the computing devices 102*a*-*c* in the cluster 104 based on their respective participation characteristics. In some instances, the participation characteristics of a computing device may directly indicate the participation responsibilities for which the computing device has individually determined that it is capable of performing. For example, the computing device 102*b* may determine that it is able to obtain and cache video resources from the network based on its high-speech wired connection to a network and its relatively large amount of available memory. As a result, the computing device 102*c*, as the manager of the cluster of computing devices 104, may associate the participation responsibilities of obtaining and caching video resources with the computing device 102*b*. In this example, the computing device 102*c* may cause the computing device 102*b* to obtain, process, or provide video resources to a computing device that has requested the video resources from the cluster of devices 104.

In some embodiments, the computing device 102*c* may, alternatively or additionally, associate participation responsibilities with a computing device in the cluster of computing devices 104 based on an analysis of the computing device's current participation characteristics. For example, the participation characteristics of the computing device 102*a* may not explicitly or directly indicate that the computing device 102*a* is available to obtain audio data resources, but the computing device 102*c* may determine from those participation characteristics that the computing device 102*a* includes an audio processing application or specialized hardware that may enable the computing device 102*a* to obtain, cache, or provide audio data resources more efficiently than other computing devices in the cluster 104. In such an example, the computing device 102*c* may assign or associate, to the computing device 102*a*, the participation responsibility of obtaining, processing, storing, or providing audio data resources.

In some embodiments, the manager computing device 102*c* may receive requests for network resources from computing devices (e.g., computing devices within or without the cluster) and may dynamically leverage the respective capabilities and characteristics of each of the computing devices 102*a*-102*c* in the cluster 104 in order to ensure that the most qualified or capable computing device in the cluster responds to the resource requests. Thus, in the above example in which the computing device 102*c* has associated video resources with the computing device 102*b*, the computing device 102*c* may receive a request for video resources from a requesting computing device (not shown) and, in response, may cause the computing device 102*b* to obtain the requested video resources from a network content provider and to provide the requested video resources to the requesting computing device. Further, the computing device 102*c* may also identify a computing device in the cluster 104 that is associated with a participation responsibility to store the obtained video resources. Continuing with the above example, the computing device 102*c* may cause the computing device 102*b* to cache the video resources in addition to obtaining them from the network content provider, though in other examples, the computing device 102*c* may cause another computing device to store the video resources obtained by the computing device 102*b* in the event that the other computing device is associated with participation characteristics that indicate a superior ability to cache the obtained video resources.

In some embodiments, the computing device 102*c* may, as the manager of the cluster of devices 104, continually determine the most up-to-date participation characteristics for each of the computing devices in the cluster. For example, the computing device 102*c* may determine its own up-to-date participation characteristics and may poll each of the other computing devices 102*a*-*b* for information regarding their respective, current participation characteristics. In response to determining that one or more of the computing devices 102*a*-*c* have changed their participation characteristics, the computing device 102c may dynamically reassign or re-associate participation responsibilities to the computing devices 102a-c. For example, in the event that the computing device 102b has started executing an application that requires a substantial processing and networking resources (e.g., an online video game), the computing device 102c may determine that the computing device 102b may be unable or less able to obtain video resources from the network while executing that application. As a result, the computing device 102c may identify another computing device in the cluster 104 that may now be the most suited device in the cluster 104 for obtaining video resources from the network. In some embodiments, the computing device 102c, as the manager of the cluster 104, may identify and react to the changes in the participation characteristics of the devices in the cluster 104 either on a periodic basis or in response to a particular event, such as a request for a resource from a requesting computing device.

As described, the computing device 102c, as the manager of the cluster 104, may determine changes in its participation characteristics. In some embodiments, the computing device 102c may determine, based on its participation characteristics, that it is not able to serve as the manager of the cluster 104. For example, the computing device 102c may determine that a user of the computing device 102c has initiated an application on the computing device 102c that requires a substantial amount of processing, memory, or network resources, and the computing device 102c may determine that it may no longer be suited to serving as the manager device while this application is running. For example, the determination may be made based on evaluating a minimum threshold of available computing device resources of a threshold of resource utilization. In such embodiments, the computing device 102c may notify other computing devices in the cluster 104 that it will no longer be designated as the managing operation or that additional computing devices will assume some aspect of the manager device designation. In response, the other computing devices in the cluster 104 may exchange participation characteristics and may elect or appoint a new manager device of the cluster 104. In some embodiments, the previously designated manager device may send information to the updated or newly designated manager device describing the responsibilities, participation characteristics, or cached resources associated with each of the computing devices in the cluster 104. As a result, the new/updated manager device may resume one or more operations of the previously designated manager device. In some embodiments, such as when a manager device leaves the cluster, a new manager device will be designated and may have to obtain updated information related to the participation characteristics, cached resources, or responsibilities from the devices remaining in the cluster, such as by polling these devices. In such embodiments, the new manager device may reassign responsibilities or resources based on the current participation characteristics of the devices in the cluster.

While descriptions of the above embodiments refer to a manager device within the cluster 104, in some embodiments, the cluster 104 may include or support two or more manager devices within a cluster. For example, the computing device 102c and 102b may both serve as manager devices within the cluster 104. In such embodiments, the multiple manager devices may coordinate or distribute their responsibilities in managing the cluster 104. For instance, the computing device 102c may manage requests for resource from requesting computing devices, and the computing device 102b may manage changes to the participation responsibilities of the computing devices within the cluster 104. In other embodiments, the multiple manager devices may establish a hierarchy of responsibility such that one manager device may assume a primary manager device role and additional manager devices may operate as an overflow or redundant manager devices.

Figure 1B:
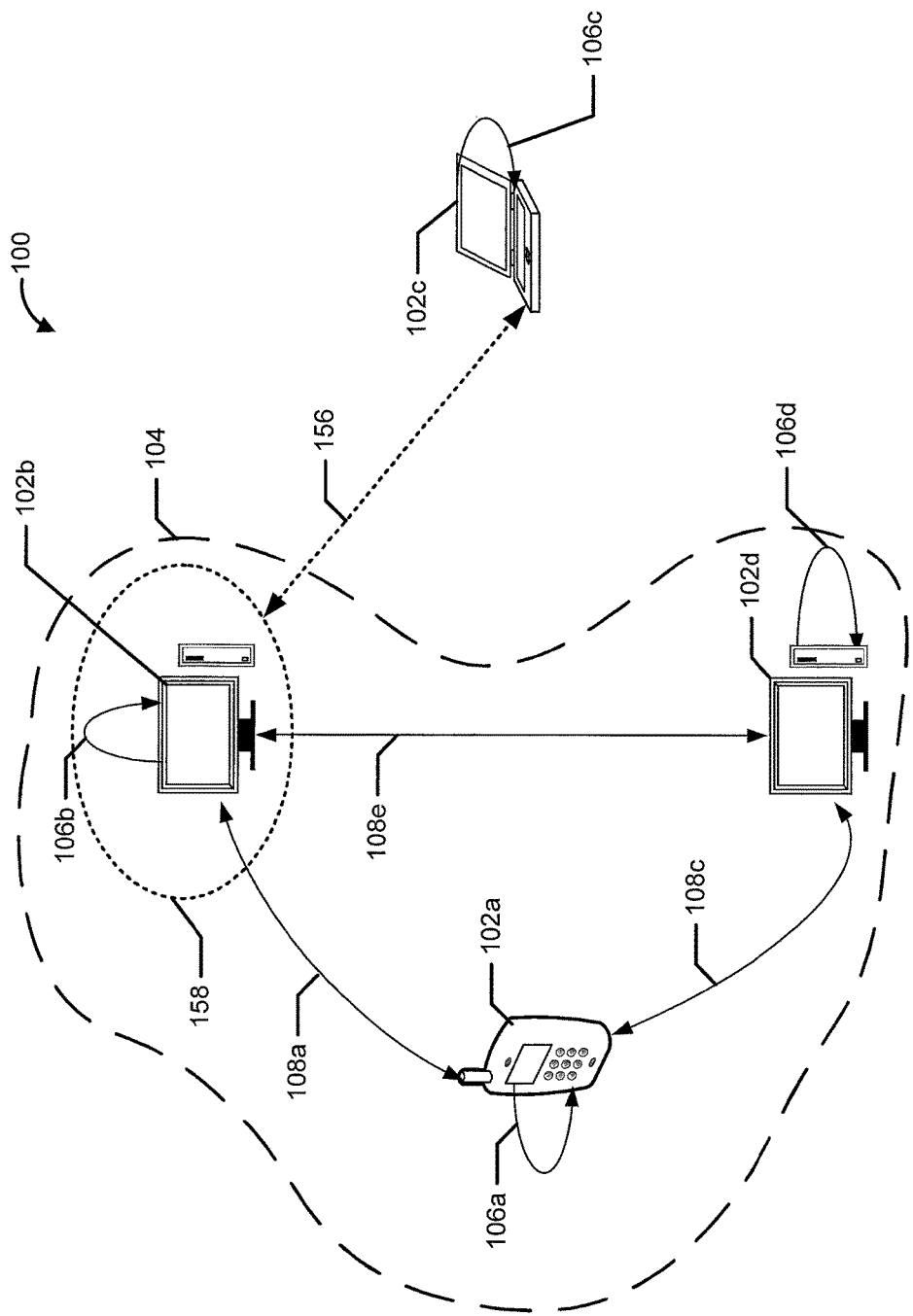
FIG. 1B is a system block diagram of another configuration of the cluster of computing devices, according to some embodiments.

FIG. 1B illustrates another configuration of the system 100 resulting from a change in membership to the cluster of computing devices 104, according to some embodiments. Specifically, the example shown in FIG. 1B illustrates a change to the cluster of computing devices 104 in which the computing device 102c has departed from the cluster of computing devices 104 and the computing device 102d has joined the cluster of computing device 104.

As noted above, the participation responsibilities of each of the computing devices in the cluster 104 may be based on dynamic changes to the participation characteristics of those computing devices. Similarly, the membership of a cluster of devices may be dynamic, and the participation responsibilities of each of the computing devices in the cluster may change to reflect the addition or departure of members from the cluster. As such, the participation responsibilities of the computing devices in the cluster 104 at any given time may reflect the participation characteristics of the computing devices within the cluster 104 at that time.

In the example illustrated in FIG. 1B, the computing device 102c may have left or un-enrolled from the cluster 104. For example, a user of the computing device 102c may have physically relocated the computing device 102c to a location in which the computing device 102c is no longer in communication with any of the other computing devices in the cluster 104. Alternatively, the computing device 102c may have individually determined, based its current participation characteristics, to no longer participate in the cluster 104. For instance, the user of the computing device 102c may have started an application on the computing device 102c that requires a significant amount of processing and networking resources, and as such, the computing device 102c may no longer be able to obtain and cache resources on behalf of other computing devices and may also no longer be able to coordinate the operations of other computing devices in the cluster 104. In such embodiments, while not participating in the cluster 104, the computing device 102c may still be in communication with one or more computing devices within the cluster 104, such as via a communication link 156, and the computing device 102c may optionally rejoin the cluster 104 at a later time based on its participation characteristics at that time.

In some embodiments, a computing device that is departing from a cluster of computing devices may send a notification to one or more of the computing devices in that cluster, and this notification may indicate that the departing computing device is about to leave the cluster. For example, the computing device 102c may inform one or more of the computing devices in the cluster 104 that the computing device 102c is dropping out of the cluster. In some embodiments, the cluster of computing devices may determine that a computing device has left the cluster without receiving a notification, such as when no computing device in the cluster is able to communicate with the departing computing device. For example, the computing device 102c may suddenly lose power or may be taken out of communication range of the cluster before the computing device 102c has an opportunity to alert the cluster 104. In such embodiments in which the computing device 102c leaves the cluster 104 without notification, the remaining computing devices of the cluster 104 may exchange information with each other to attempt to determine the state of the caches of each of the computing devices in the cluster 104. In some embodiments, this may correspond to electing a new manager device of the cluster and determining the state of the caches and the participation characteristics of the devices in the cluster 104.

In some embodiments, the manager of the cluster of devices 104 may respond to the departure of a computing device by determining the participation responsibilities associated with or assigned to the departing device and redistributing those participation responsibilities to other members of the cluster 104. In the event that the departing computing device is the manager computing device (e.g., the computing device 102c), the computing devices within the cluster may share their respective participation characteristics and may elect or appoint a new manager computing device. For example, as illustrated in FIG. 1B, in response to determining that the computing device 102c has left the cluster 104, the computing devices 102a-b may determine and share their current respective participation characteristics (e.g., by performing the operations 106a-106b as described with reference to FIG. 1A). The computing devices 102a-b may then elect the computing device 102b as the new manager computing device of the cluster 104, as indicated by the indicator 158. As the new manager computing device, the computing device 102b may analyze the participation characteristics of the computing devices 102a-b and may associate or assign participation responsibilities to the computing devices 102a-b based on those participation responsibilities. In some embodiments, one or more of these participation responsibilities may have originally been associated with the computing device 102c, and these one or more participation responsibilities may be redistributed to the computing devices 102a-b that are remaining in the cluster 104.

Continuing with the above example, the new manager computing device 102b of the cluster 104 may receive and respond to resource requests from requesting computing devices. In an example in which the computing device 102c remains in communication with the manager computing device 102b subsequent to departing the cluster 104, the new manager computing device 102b may receive a request for a network resource from the computing device 102c, such as via the communication link 156. In response, the computing device 102b may identify a computing device in the cluster 104 that is most suitable for obtaining and providing the requested resource to the computing device 102c, and the computing device 102b may cause the identified computing device (e.g., either the computing device 102a or the computing device 102b, itself) to provide the requested resource to the computing device 102c.

In some embodiments, the manager computing device of the cluster of computing devices may receive a request to join the cluster from another computing device. In such embodiments, the manager computing device may obtain the current participation characteristics of the other computing device and may determine whether to admit that computing device to the cluster. In the example illustrated in FIG. 1B, the computing device 102d may have determined to join the cluster 104 based on its current participation characteristics. For example, as discussed above (see FIG. 1A), while the computing device 102d may have initially determined not to join the cluster 104 as a result of streaming ultra-high definition video content, the computing device 102d may have ceased streaming the video content and, as a result, may have determined that it is now able to participate in the cluster 104. As such, the computing device 102d may send its current participation characteristics to the computing device 102b. In response, the computing device 102b may, as the manager of the cluster 104, determine to admit the computing device 102d to the cluster 104 and, additionally, may associate the computing device 102d with one or more participation responsibilities (e.g., caching and obtaining video resources on demand). In some embodiments, in response to including the computing device 102d in the cluster 104, the computing device 102b may adjust one or more participation responsibilities assigned or associated with the preexisting members of the cluster 104, such as by shifting one or more participation responsibilities from either the computing devices 102a or 102b to the computing device 102d.

FIG. 2 is a functional block diagram of an illustrative system 200 suitable for implementing some aspects of the present disclosure. The system 200 may include one or more computing devices, such as the computing devices 102a-d (e.g., as described with reference to FIGS. 1A and 1B) and one or more other computing devices 202a-b, which may be similar to or different from one or more of the computing devices 102a-d. In a non-limiting example, the computing device 202a may be another desktop computer similar to the computing devices 102b or 102d, and the computing device 202b may be another laptop computer similar to the computing device 102c.

As described (e.g., with reference to the system 100 illustrated in FIG. 1A), the computing devices 102a-c may be organized into the cluster of computing devices 104. Similarly, the computing devices 202a-b may be formed into a separate cluster of computing devices 204. In particular, the computing devices 202a-b may have determined their respective participation characteristics and may have determined to form the cluster of computing devices 204 with each other, as described above.

In the example illustrated in FIG. 2, the computing device 102d may be in communication with the cluster of devices 104 via a communication link 203, but the computing device 102d may not be participating in the cluster of devices 104. For example, the computing device 102d may have determined not to participate in the cluster 104, or the manager computing device of the cluster 104 may have determined not to reject the computing device 102d's request to join the cluster 104.

In some embodiments, the manager computing device of the cluster of computing devices 104 may receive communications from computing devices that are not in the cluster of computing devices 104, such as the computing device 102d. In such embodiments, the manager computing device of the cluster 104 may receive requests for resources from requesting computing devices, requests to join the cluster of devices 104 from prospective members, and other communications. The manager computing device of the cluster 104 may respond accordingly, such as by identifying and causing one of the computing devices to provide the requested resource to the requesting computing device or by determining whether to admit the prospective member to the cluster of devices 104 based on the participation characteristics received from the prospective member. In some embodiments, communications from computing devices outside the cluster of devices 104 may be received by any of the computing devices within the cluster 104, and these communications may be routed to the manager computing device so that the manager computing device of the cluster 104 may take appropriate action.

In some embodiments, separate clusters of computing devices may be in communication. In the example illustrated in FIG. 2, the cluster of computing devices 104 may be in communication with the cluster of computing devices 204, such as via communication link 212. In such embodiments, individual computing devices within each of the clusters may be in communication with each other, computing devices from one cluster may one be in communication with the manager computing device of the other cluster, or only the manager computing devices of the separate clusters may be in communication.

In the system 200, the one of more of the devices in the cluster of devices 104 may be in communication with a network content provider 206 via a network 208. In particular, the cluster of devices 104 may communicate over the network 208 via a communication link 214, which may correspond to one or more of a cellular link, a Wi-Fi communication link, a wired link, or one of various other types of communication links. For example, the computing device 102a may communication with the network content provider 206 via a cellular link to the network via a base station (not shown).

In some embodiments, one or more of the computing devices, either in the cluster 104 or out of the cluster 104, may be in local communication with one or more other computing device of the cluster 104 but may not be in direct communication with the network content provider 206. For example, the computing device 102c may be have a low-power, Bluetooth® connection to the other device in the cluster 104, but the computing device 102c may not have a direct network connection to the network content provider 206. Similarly, the computing device 102d may be in communication with one or more of the devices in the cluster 104 via the communication link 203, but the computing device 102d may not be able to communicate directly with the network content provider 206. In such embodiments, one or more of the other computing devices in the cluster 104 may serve as a "proxy server" of sorts by responding to network resource requests on behalf of those devices, as described.

The network 208 may be any wired network, wireless network, or combination thereof. In addition, the network 208 may be a personal area network, local area network, wide area network, cable network, satellite network, cellular telephone network, etc. or combination thereof. In addition, the network 208 may be a personal area network, local area network, wide area network, over-the-air broadcast network (e.g., for radio or television), cable network, satellite network, cellular telephone network, or combination thereof. For example, the network 208 may be a publicly accessible network of linked networks, possibly operated by various distinct parties, such as the Internet. In some embodiments, the network 208 may be private or semi-private networks, such as a corporate or university intranets. The networks 208 and 214 may include one or more wireless networks, such as a Global System for Mobile Communications (GSM) network, a Code Division Multiple Access (CDMA) network, a Long Term Evolution (LTE) network, or some other type of wireless network. The network 208 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

Figure 3:
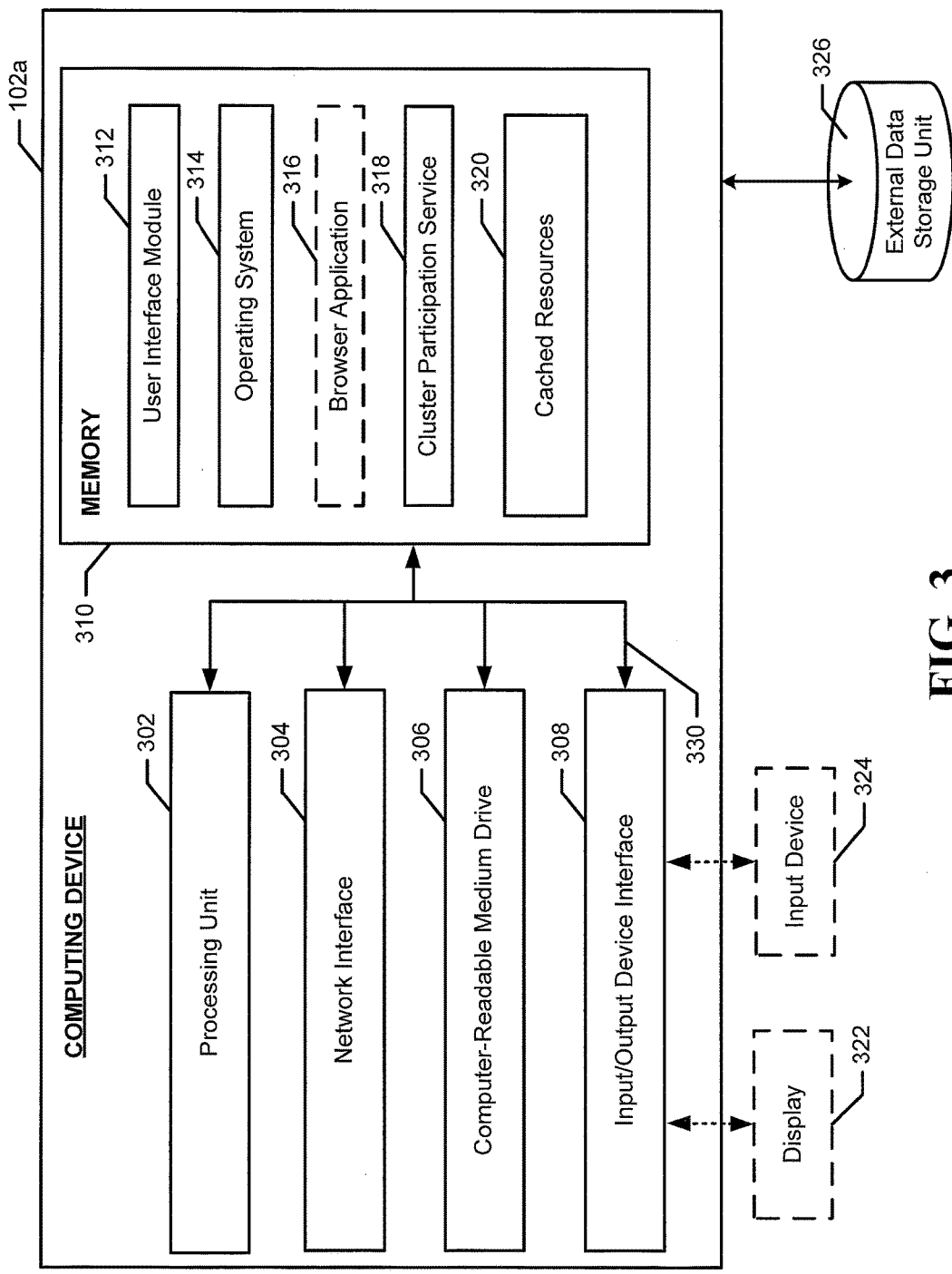
FIG. 3 is a component diagram of an example computing device suitable for use with some embodiments.

FIG. 3 depicts a general architecture of the computing device 102a, which—as described above with reference to FIGS. 1A, 1B, and 2—may be configured to participate in or manage a cluster of computing devices. The general architecture of the computing device 102a depicted in FIG. 3 includes an arrangement of computer hardware and software components that may be used to implement aspects of the present disclosure. The computing device 102a may include many more (or fewer) elements than those shown in FIG. 3. It is not necessary, however, that all of these generally conventional elements be shown in order to provide an enabling disclosure.

As illustrated, the computing device 102a includes a processing unit 302, a network interface 304, a computer readable medium drive 306, an input/output device interface 308, an optional display 322, and an optional input device 324, all of which may communicate with one another by way of a communication bus. The network interface 308 may provide connectivity to one or more networks (e.g., the network 208) or computing systems and, as a result, may enable the computing device 102a to receive and send information and instructions from and to other computing systems or services. For example, the computing device 102a may receive requests for network resources from one or more computing devices with the network interface 304, and the processing unit 302 may, in response, obtain and provide the requested network resources to those one or more computing devices using the network interface 304.

The processing unit 302 may communicate to and from memory 310 and may provide output information for the optional display 322 via the input/output device interface 308. The input/output device interface 308 may also accept input from the optional input device 324, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or other input device known in the art.

The memory 310 may contain computer program instructions (grouped as modules or components in some embodiments) that the processing unit 302 may execute in order to implement one or more embodiments. The memory 310 generally includes RAM, ROM, and/or other persistent, auxiliary, or non-transitory computer-readable media. The memory 310 may store an operating system 312 that provides computer program instructions for use by the processing unit 302 in the general administration and operation of the computing device 102a. The memory 310 may further include computer program instructions and other information for implementing aspects of the present disclosure. For example, in some embodiments, the memory 310 may include a cluster participation service 320, which may be executed by the processing unit 302 to perform various operations, such as those operations described with reference to FIGS. 1A, 1B, 2, and 5-8. In some embodiments, the cluster participation service 320 may implement various aspects of the present disclosure. For example, the cluster participation service 320 may determine participation characteristics of the computing device 102, form or join a cluster of computing devices having one or more other computing devices, and participate in the cluster of computing devices. In some embodiments, the cluster participation service 320 may also, or alternatively, manage the operations and participation responsibilities of other computing devices in the cluster of computing devices to which the computing device 102 belongs. For example, in the event that the computing device 102a is elected or appointed as the manager of the cluster of computing devices, the cluster participation service 318 may monitor for changes in the participation characteristics of the devices within the cluster, re-assign or adjust participation responsibilities of one or more of the computing devices in the cluster based on changes to a computing device's participation characteristics, and adjust the participation responsibilities of individual computing devices in the cluster based on the introduction of new members or the departure of existing members of the cluster of devices.

While the cluster participation service 320 is illustrated as a distinct module in the memory 310, in some embodiments, the cluster participation service 320 may be incorporated as a module in the operating system 312 or another application or module, and as such, a separate cluster participation service 320 may not be required to implement some embodiments.

In some embodiments, the computing device 102a may receive network resources and may cache or store them in the memory 310 as cached resources 320. In such embodiments, the cluster participation service 320 may receive a request to provide resources included in the cached resources 320 to a requesting computing device. In response, the cluster participation service 320 may determine whether these resources are stored in the cached resources 320. In the event that the requested resources are stored in the cached resources 320, the cluster participation service 320 may provide these resources to the requesting computing device without contacting a network content provider. On the other hand, in the event that the requested resources are not included in the cached resources, the cluster participation service 320 may obtain these resources from the network content provider. In some further embodiments, subsequent to obtaining the requested resources from the network, the cluster participation service 320 may store the requested resources in the cached resources 320 in order to avoid having to fetch these resources from the network in the event that these resources are requested again. In some embodiments, resources may be stored and retrieve from an external data storage unit 326.

Further, in some embodiments, the above description of the computing device 102a may also be applied to various other computing devices, such as the computing devices 102b-d and 202a-b (e.g., as described with reference to FIGS. 1A, 1B, and 2). In such embodiments, the computing devices 102b-d and 202a-b may include the components discussed above and may be configured to perform operations described with reference to the various embodiments.

Figure 4:
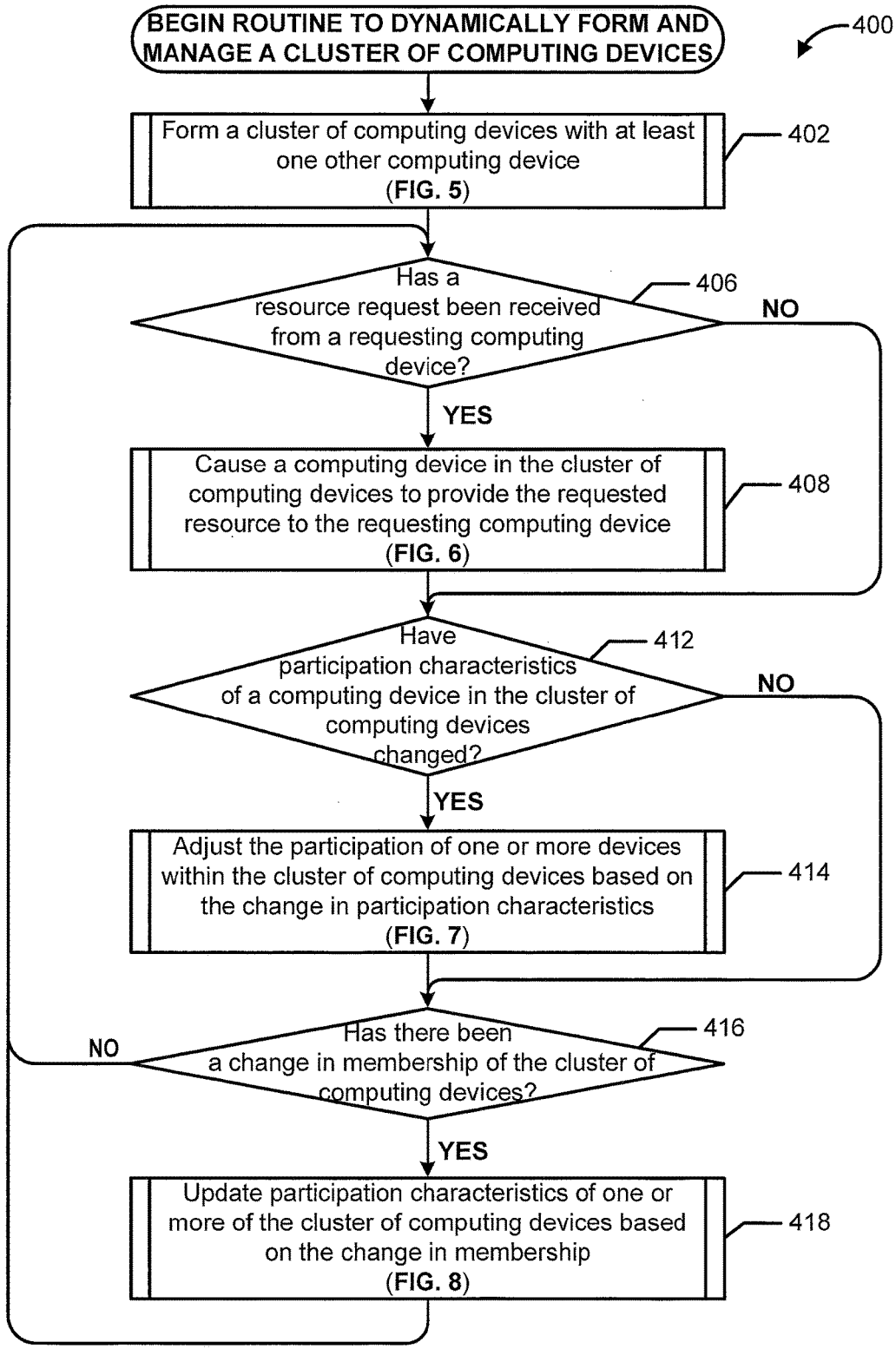
FIG. 4 is a process flow diagram illustrating a computer-implemented method for dynamically managing a cluster of computing devices, according to some embodiments.

FIG. 4 is a process flow diagram of an illustrative routine 400 for dynamically forming and managing a cluster of computing devices. The routine 400 may be implemented with a cluster participation service operating on a computing device (e.g., the cluster participation service 320 of the computing device 102a as described with reference to FIG. 3).

At block 402, the cluster participation service 320 may form a cluster of computing devices with at least one other computing device. In some embodiments, such as those further described with reference to subroutine 500 (see FIG. 5), the cluster participation service 320 may determine participation characteristics of the computing device 102a. These participation characteristics may include information regarding or otherwise indicating current capabilities of the computing device 102a and current operations and activities of the computing device 102a. In some embodiments of the operations performed at block 402, the cluster participation service 320 may exchange these participation characteristics with the at least one other computing device in the cluster of computing device (e.g., the computing devices 102b, 102c, or 102d), and the cluster, as a collective, may elect or appoint a manager of the cluster of computing devices. For the sake of a simplified description of various embodiments, the following description assumes that the computing device 102a was elected or appointed as manager of the cluster of computing devices. However, this assumption is not meant to limit or narrow the scope of this disclosure.

In decision block 406, the cluster participation service 320 may determine whether a resource request has been received from a requesting computing device, such as by monitoring for receipt of a resource request directed to the cluster of computing devices. In some embodiments, the manager computing device on which the cluster participation service 320 is operating may serve as the point device within the cluster of devices such that communications or resource requests directed to the cluster of computing devices are received at the manager computing device.

In response to determining that a resource request has been received (i.e., decision block 406="YES"), the cluster participation service 320 may cause a computing device in the cluster of computing devices to provide the requested resource to the requesting computing device, at block 408. In some embodiments, the cluster of computing devices may collectively serve as a proxy device for the requesting computing device. In particular, the cluster of computing devices may collectively obtain the requested resource on behalf of the requesting computing device and may provide the requested resource to the requesting computing device. As a result, the requesting computing device may not need to make a request over the network and may avoid experiencing network congestion.

In some embodiments of the operations performed at block 408, in response to receiving a request for a resource, the cluster participation service 320 may cause a computing device in the cluster that has a cached copy of the requested resource to provide a copy of the resource to the requesting computing device. Alternatively, in the event that no computing device has a cached copy of the requested resource, the cluster participation service 320 may cause one of the computing devices in the cluster to obtain the requested resource from a network content provider and, subsequently, to provide the obtained resource to the requesting computing device. These and other embodiments of the operations performed at block 408 are described further with reference to subroutine 600 (e.g., as discussed with reference to FIG. 6).

In response to determining that a resource request has not been received (i.e., decision block 406="NO") or in addition to causing a computing device in the cluster of computing devices to provide the requested resource to the requesting computing device at block 408, the cluster participation service 320 may determine whether participation characteristics of at least one computing device in the cluster of computing devices has changed, in decision block 412. As described above (e.g., with reference to FIG. 1A or 1B), the cluster participation service 320 may monitor for changes in the capability of one or more of the computing devices in the cluster to participate in the cluster. Example changes to a computing device may include a change in activities performed on the computing device (e.g., starting or stopping execution of an application or service), a change in an amount of available memory for storing resources, a change in the network connectivity of the computing device (e.g., an increase or decrease in network speed), or the like.

In response to determining that participation characteristics of at least one computing device in the cluster of computing devices has changed (i.e., decision block 412="Yes"), the cluster participation service 320 may adjust the participation of one or more computing device within the cluster based on the determined change in participation characteristics of that at least one computing device in the cluster, at block 414. For example, in response to determining that that a first computing device in the cluster has no more available memory to cache additional resources, the cluster participation service 320 may identify a second computing device in the cluster that has available space and may cause the second computing device to cache resources in the future instead of the first computing device. The cluster participation service 320 may also dynamically reallocate the resources cached on the devices in the cluster based on changes to the participation characteristics of one or more of those devices in the cluster. In the above example, the cluster participation service 320 may additionally, or alternatively, cause the first computing device to transfer at least a portion of the resources cached on the first computing device to the second computing device in order to balance the caching load. The operations of adjusting the participation of one or more computing devices within the cluster as performed at block 408 are described further with reference to subroutine 700 as discussed with reference to FIG. 7.

In response to determining that participation characteristics of at least one computing device in the cluster of computing devices has not changed (i.e., decision block 412="NO") or in addition to adjusting the participation of one or more computing devices based on a determined change in participation characteristics of the at least one computing device at block 414, the cluster participation service 320 may determine whether there has been a change in membership of the cluster of computing devices, in decision block 416. In particular, the cluster participation service 320 may monitor for the departure of computing devices from the cluster or for the addition of a new computing device, as these changes in the membership of the cluster may also prompt the cluster participation service 320 to reevaluate the participation responsibilities that are assigned or associated with each of the computing devices currently in the cluster.

In response to determining that there has been a change in membership of the cluster of computing devices (i.e., decision block 416="YES"), the cluster participation service 320 may update participation characteristics of one or more computing devices within the cluster based on the determined change in membership of the cluster, at block 418. Some embodiments of the operations of updating participation characteristics of one or more computing devices within the cluster as performed at block 418 are described further with reference to subroutine 700 as discussed with reference to FIG. 7.

In response to determining that there has not been a change in membership of the cluster of computing devices (i.e., decision block 412="NO") or in addition to updating the participation characteristics of one or more computing devices within the cluster at block 418, the cluster participation service 320 repeat the above operations in a loop by again determining whether a resource request has been received from a requesting computing device, at block 404.

Figure 5:
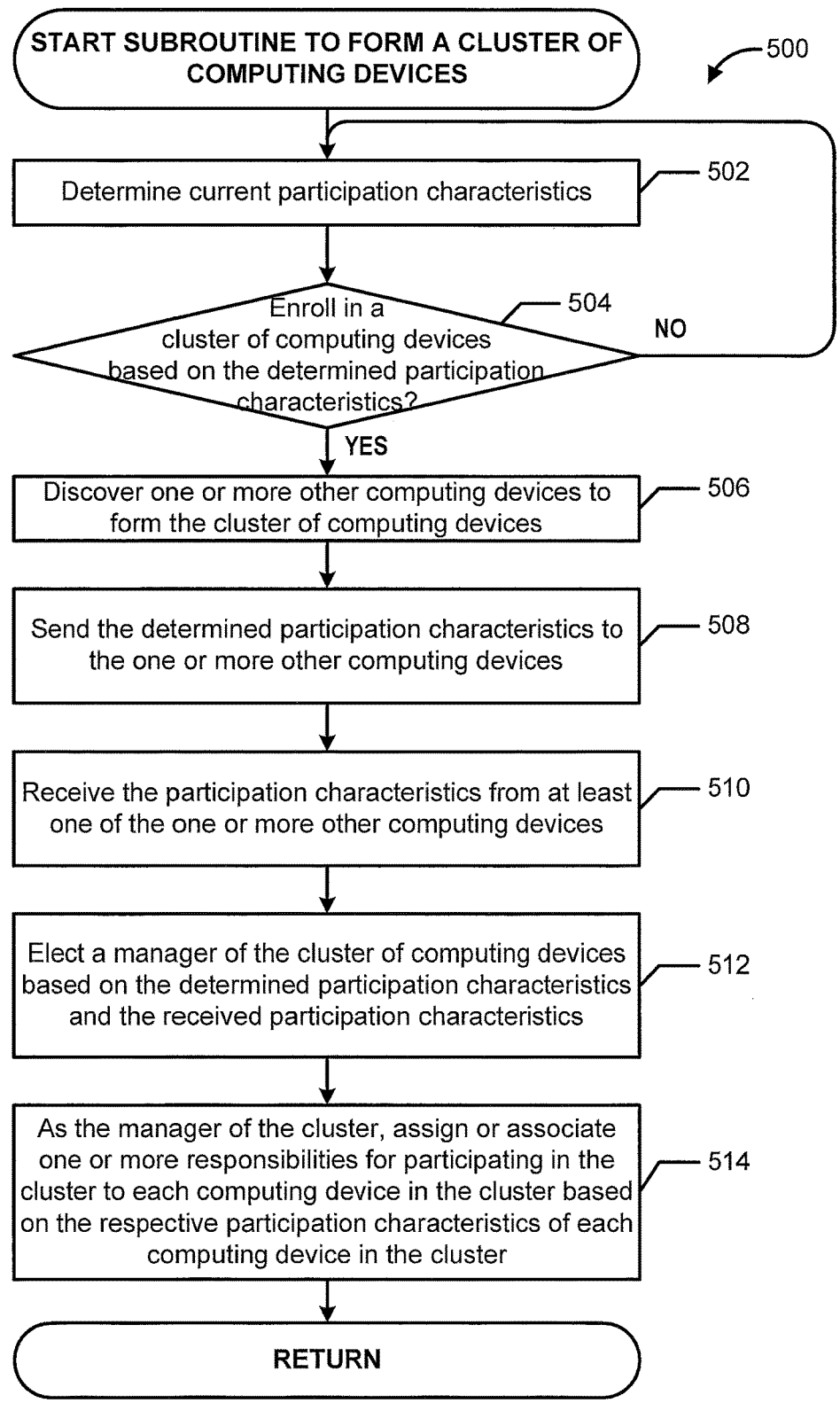
FIG. 5 is a process flow diagram illustrating a computer-implemented method for forming a cluster of computing devices based at least in part on the participation characteristics of the computing devices within the cluster, according to some embodiments.

FIG. 5 is a process flow diagram of an illustrative subroutine 500 for forming a cluster of computing devices, according to some embodiments. The subroutine 500 may be implemented with a cluster participation service operating on a computing device (e.g., the cluster participation service 320 of the computing device 102a as described with reference to FIG. 4). The subroutine 500 implements an embodiment of the operations of block 402 of the routine 400 as described with reference to FIG. 4. As such, the cluster participation service 320 may begin performing the operations of the subroutine 500 at the start of the routine 500.

At block 502, the cluster participation service 320 may determine participation characteristics currently present or monitored on the computing device executing the cluster participation service 320. For example, the cluster participation service 320 may determine the computing device's hardware components, the amount of available memory on the computing device, the applications currently executing on the computing device, the networks to which the computing device is connected, and various other factors that may relate to the computing device's ability to participate in a cluster of computing devices, such as by obtaining and caching resources on behalf of other computing devices.

In decision block 504, the cluster participation service 320 may determine whether to enroll the computing device executing the cluster participation service 320 in a cluster of computing devices based on the participation characteristics that were determined for the computing device at block 502. In some embodiments of the operations performed in decision block 504, the cluster participation service 320 may determine whether participating in the cluster of devices would degrade the performance or usability of the computing device beyond an acceptable amount. For example, in the event that the participation characteristics determine at block 502 indicate that the computing device executing the cluster participation service 320 has a limited amount of available space to cache resources, that such computing device is currently engaged in other resource-intensive operations, or that such computing device has a slow or weak network connection, the cluster participation service 320 may determine not to enroll that computing device in a cluster of computing devices. In another example, the cluster participation service 320 may determine to enroll the computing device in response to determining that the current participation characteristics of the computing device determined at block 502 indicate that the computing device has ample space to store resources, has a fast network connection, or the like.

As such, in response to determining not to enroll the computing device executing the cluster participation service 320 in a cluster of computing devices (i.e., decision block 504="NO"), the cluster participation service 320 may continue determining or monitoring the current participation characteristics of the computing device. In some embodiments, the cluster participation service 320 may periodically determine the most up-to-date participation characteristics of the computing device and may reassess whether to enroll the computing device based on those most up-to-date participation characteristics. In some embodiments, the cluster participation service 320 may repeat the operations of blocks 502 and 504 in response to determining that a change in the capabilities, functionality, state, or other characteristics of the computing device has changed.

In response to determining to enroll the computing device in a cluster of computing devices (i.e., decision block 504="YES"), the cluster participation service 320 may discover one or more other computing devices, at block 506, and may form a cluster of computing devices with those one or more discovered computing devices. In an example, the cluster participation service 320 may utilize one or more discovery techniques to discover the one or more other computing devices. For example, the cluster participation service 320 may discover one or more other computing devices that are connected to a local network (e.g., a home or office network) and that are attempting to form a cluster of computing devices. In such embodiments, the cluster participation service 320 may exchange identifying credentials (e.g., network name and address) with the one or more other computing devices so that those computing devices may be able to identify and communicate with the computing device executing the cluster participation service 320. Similarly, the cluster participation service 320 may receive identifying credentials from the one or more other computing devices.

Subsequent to forming the cluster of computing devices at block 506, the cluster participation service 320 may send, at block 508, the participation characteristics determined at block 502 to the one or more other computing devices discovered at block 506. Further, at block 510, the cluster participation service 320 may receive other participation characteristics from at least one of the one or more computing devices that were discovered at block 506. In some embodiments, the one or more other computing devices may determine their respective participation characteristics by performing operations similar to those operations described above with reference to block 502.

At block 512, the cluster participation service 320 may participate in an election of a manager of the cluster of computing devices based on the participation characteristics determined for the computing device executing the cluster participation service 320 at block 502 and based on the participation characteristics that were received at block 510 from at least one of the one or more computing devices discovered at block 506. In some embodiments, the cluster participation service 320, in conjunction with cluster participation services operating on the one or more other computing devices, may identify a computing device of the cluster of devices that may be the most suited or capable of managing the cluster of devices based on that computing device's participation characteristics. For example, the elected or appointed computing device may be associated with participation characteristics that indicate a relatively superior amount of processing resources or that that computing device is in direct communication with the highest number of computing devices in the cluster, and the like.

As discussed above, for ease of description, it may be assumed that the computing device 102*a* is elected or appointed as the manager of the cluster of computing devices, at block 512. As such, the cluster participation service 320 may assign or associate one or more participation responsibilities for participating in the cluster of computing devices to each computing device in the cluster, at block 514. In particular, the cluster participation service 320 may analyze the participation characteristics of each computing device in the cluster, both individually and in context of the participation characteristics of other computing devices, to identify tasks, operations, or other participation responsibilities that the computing device may be suited to perform as part of the cluster of computing devices. For example, in response to determining that a computing device has a fast network speed, the cluster participation service 320 may associate that computing device with the task of obtaining resources from the network. In another example, the cluster participation service 320 may determine that another computing device has a relatively large amount of available memory, and the cluster participation service 320 may assign that computing device with the participation responsibility of caching network resources.

In some embodiments of the operations performed in block 514, the cluster participation service 320 may, as part of determining responsibilities for each computing device in the cluster, may determine limitations of the responsibilities of certain computing devices or conditions of participating in the cluster of devices. For example, the cluster participation service 320 may determine that certain computing devices in the cluster are not responsible (or are not allowed) to obtain resources from a network resource provider or that certain computing devices are limited to participating in the cluster at certain times of day or obtaining certain resource types, and the like. Similarly, the cluster participation service 310 may also apportion responsibilities such that specific computing devices may be attributed particular responsibilities.

The cluster participation service 320 may end the subroutine and return to performing operations in the routine 400 as described (e.g., with reference to FIG. 4).

Figure 6:
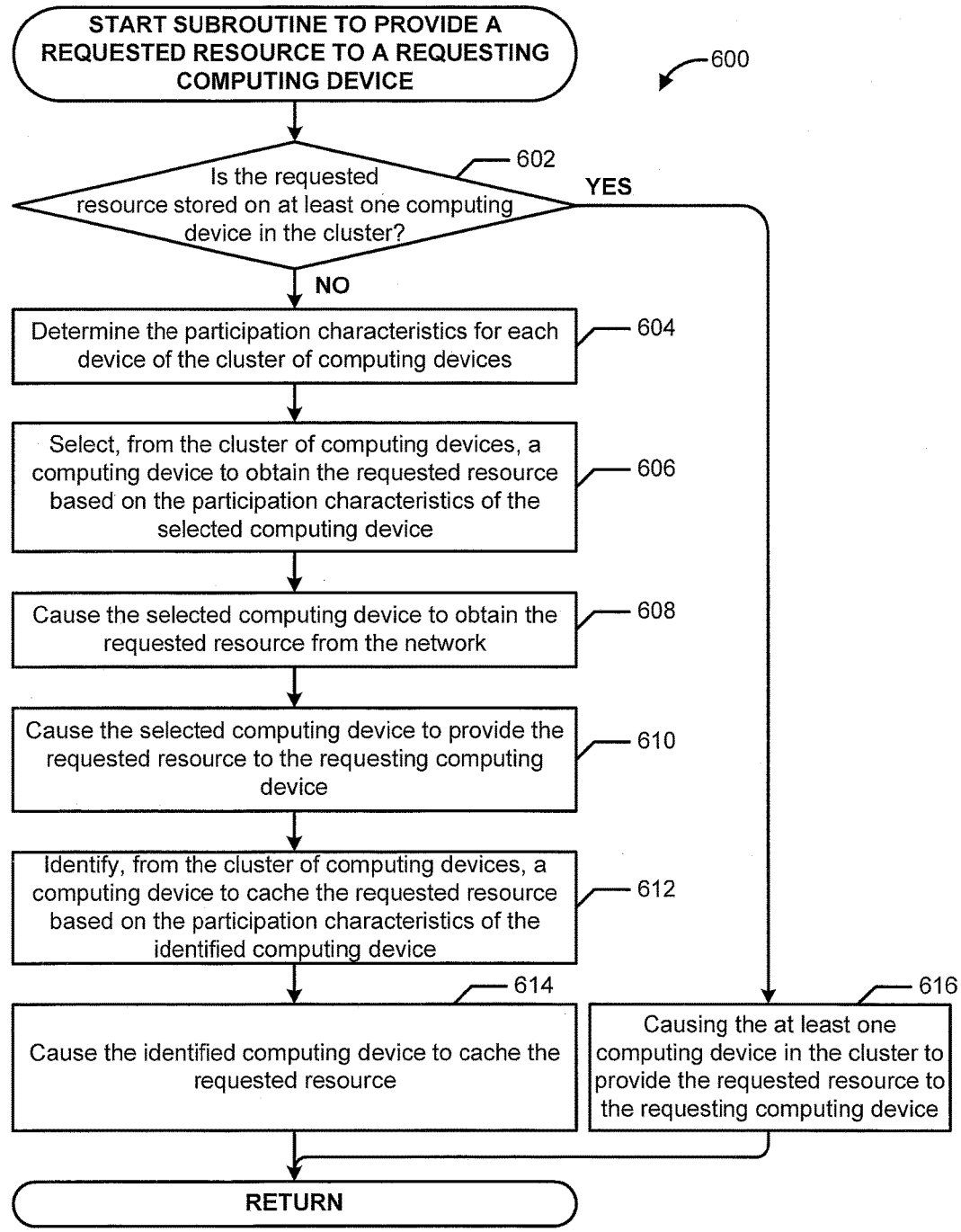
FIG. 6 is a process flow diagram illustrating a computer-implemented method for providing a requesting resource to a requesting computing device using a cluster of computing devices, according to some embodiments.

FIG. 6 is a process flow diagram of an illustrative subroutine 600 for providing a request to a requesting computing device, according to some embodiments. The subroutine 600 may be implemented with a cluster participation service operating on a computing device (e.g., the cluster participation service 320 of the computing device 102*a* as described with reference to FIG. 4). The subroutine 600 implements an embodiment of the operations of block 408 of the routine 400 as described with reference to FIG. 4. As such, the cluster participation service 320 may begin performing the operations of the subroutine 600 in response to determining that resource request has been received from a requesting computing device (i.e., decision block 406="YES" as discussed with reference to FIG. 4).

In decision block 602, the cluster participation service 320 may determine whether the requested resource is stored on at least one computing device in the cluster of computing devices. In some embodiments, the cluster participation service 320 may poll the computing devices in the cluster in order to determine whether at least one of the computing devices in the cluster has cached a copy of the requested resource. For example, the cluster participation service 320 may send information indicating the type of requested resource, a name of a file associated with the requested resource, or various other information that may enable the computing devices in the cluster to determine whether they have cached a copy of the requested resource.

In some embodiments, the cluster participation service 320 may maintain a list, database, or another data structure (e.g., a look-up table) that includes associations between resources and a location of the resource within the cluster of computing devices. In such embodiments, the computing devices of the cluster may share information regarding the resources that that are respectively cached on those devices with the computing device 102*a*. As such, the cluster participation service 320, by operating on the manager computing device 102*a*, may aggregate the resource information received from the other computing devices in the cluster so that the cluster participation service 320 may determine whether the cluster of computing devices includes a particular requested resource without having to poll the other computing device in the cluster each time a resource request is received.

In response to determining that the resource is stored on at least one computing device in the cluster of computing devices (i.e., decision block 602="YES"), the cluster participation service 320 may cause the at least one computing device in the cluster that has cached a copy of the requested resource to provide the requested resource to the requesting computing device, at block 616. For example, the cluster participation service 320 may instruct one of multiple computing devices within the cluster to provide the requested resource. Thus, in the event that a copy of the request resource is stored locally on the cluster of devices, the requesting resource and the cluster of computing devices may avoid having to make a request over the network to a network resource provider, thereby potentially reducing overall network congestion and providing the requested resource relatively faster than receiving it from the network resource provider.

In some embodiments, a resource may be split into two or more portions, and each of those portions may be stored on one or more of the computing devices within the cluster. For example, the cluster may implement a torrent-style storage protocol in which portions of the resource are divided between two or more of the computing devices and the cluster. In such embodiments, the cluster participation service 320 may, as part of performing operations in block 616, may cause at least one of the computing devices in the cluster to recreate the resource from the portions of the resource stored among the two or more computing devices and to provide the recreated resource to the requesting computing device.

Further, in some embodiments of the operations performed in block 616, the cluster participation service 320 may determine characteristics about the requesting device, such as the type of the requesting device, the manufacturer, and the like. Thus, in instances in which more than one of the computing devices in the cluster has stored a copy of the requested resource, the cluster participation service 320 may select from those one or more computing devices to provide the resource to the requesting device based at least in part on the characteristics of the requesting device. For example, the cluster participation service 320 may select a computing device to provide its cached copy of the resource to the requesting resource in the event that the selected computing device and the requesting computing device are the same model of computing device (e.g., have the same communication protocols).

In response to determining that the resource is not stored on at least one computing device in the cluster of computing devices (i.e., decision block 602="NO"), the cluster participation service 320 may determine the participation characteristics of each computing device of the cluster of computing devices, at block 604. For example, the cluster participation service 320 may determine the participation characteristics of the computing device 102a and may poll the other computing devices in the cluster to determine their respective participation characteristics. In some embodiments, the cluster participation service 320 may analyze the participation characteristics of each of the computing devices in the cluster in order to select, from the cluster of computing devices, a computing device to obtain the requested resource, at block 606. In such embodiments, the cluster participation service 320 may identify a computing device that may be particularly suited to obtaining the requested resource from a network resource provider. In an example, the cluster participation service 320 may look for a computing device that has participation characteristics that indicate that the computing device has a fast connection to the network, a particular application or processing component that may be tailored to quickly obtaining and processing resources similar in type to the requested resource (e.g., an audio-specific application suitable for obtaining and processing audio data), and the like.

The cluster participation service 320 may cause the selected computing device to obtain the requested resource from the network, at block 608, such as by sending instructions to the corresponding cluster participation service on the selected computing device. Similarly, once the selected computing device has obtained the request resource, the cluster participation service 320 may cause the selected computing device to provide the requested resource to the requesting computing device, at block 610.

In some embodiments of the operations performed in blocks 606 and 608, the cluster participation service 320 may select and cause multiple computing devices from the cluster to obtain and provide a copy of the requested resource or portions of the request resource. For example, the cluster participation service 320 may cause two or more of the computing devices in the cluster to obtain two or more portions of the resource. The cluster participation service 320 may then cause those two or more computing devices to provide those portions of the resource to the requesting computing device. Alternatively, the cluster participation service 320 may cause the two or more computing devices to create a version of the resource using the two or more portions of the resource and may cause one or more of those devices to provide the created version of the resource to the requesting device. Further, in some embodiments, the cluster participation service 320 may cause more than one computing device to cache a copy of the resource.

Further, as described, the cluster participation service 320 may select the one or more computing devices to obtain the network resource based at least in part on the characteristics of the requesting device. For example, as described, the cluster participation service 320 may compare the participation characteristics of the devices in the cluster with the characteristics of the requesting device, and the cluster participation service 320 may select the one or more computing devices in the cluster that are most similar to the requesting device.

As discussed above, the cluster of computing devices may cache resources in order to quickly respond to requests for resources that are cached in the cluster of devices. Thus, subsequent to causing the selected computing device to obtain the requested resource from the network at block 608, the cluster participation service 320 may identify, from the cluster of computing devices, a computing device to cache the requested resource based on the participation characteristics of the identified computing device, at block 612. In particular, the cluster participation service 320 may identify the computing device in the cluster that may be the most suited for storing the requested resource. For example, the cluster participation service 320 may analyze the participation characteristics of a computing device in the cluster and may determine that the participation characteristics indicate that the computing device has a relatively large amount of available memory and, as a result, may be able to cache the requested resource without potentially affecting the normal operations of that computing device. The cluster participation service 320 may consider other factors based on the participation characteristics of a computing device, including factors that indicate that computing device is particular suited to caching resources of the same type as the request resource. Once the cluster participation service 320 has identified the computing device, the cluster participation service 320 may cause the identified computing device to cache the requested resource, at block 614.

Further, in some embodiments, the cluster participation service 320 may identify multiple computing devices to cache the request resource and may cause portions of the obtained resource to be stored on these multiple identified computing devices in order to decrease the storage burden on any one of the computing devices. In such embodiments, the cluster participation service 320 may utilize various different protocols for storing portions of the requested resource on different computing devices in the cluster (e.g., Bit Torrent).

In some embodiments (not shown), the cluster participation service 320 may perform the operations at block 612 and 614 only in the event that the requested resource is not private, confidential, or otherwise marked not to be cached. For example, a browser application operating on the requesting computing device may request personal information from a website via the cluster of computing devices. In this example, the requesting device may include a "no-caching" indicator in the request to obtain the personal information sent to the cluster participation service 320, and as such, the cluster participation service 320 may skip the operations at block 612 and 614. In some embodiments, the network resource provider may similar mark the resource obtained at block 608 as private or "non-cacheable," and the cluster participation service 320 may similar skip the operations at blocks 612 and 614.

In response to either causing the identified computing device to cache the requested resource at block 614 or in response to causing the at least one computing device in the cluster to provide the requested resource to the requested computing device at block 616, the cluster participation service 320 may end the subroutine and return to performing operations in the routine 400 as described (e.g., with reference to FIG. 4)

Figure 7:
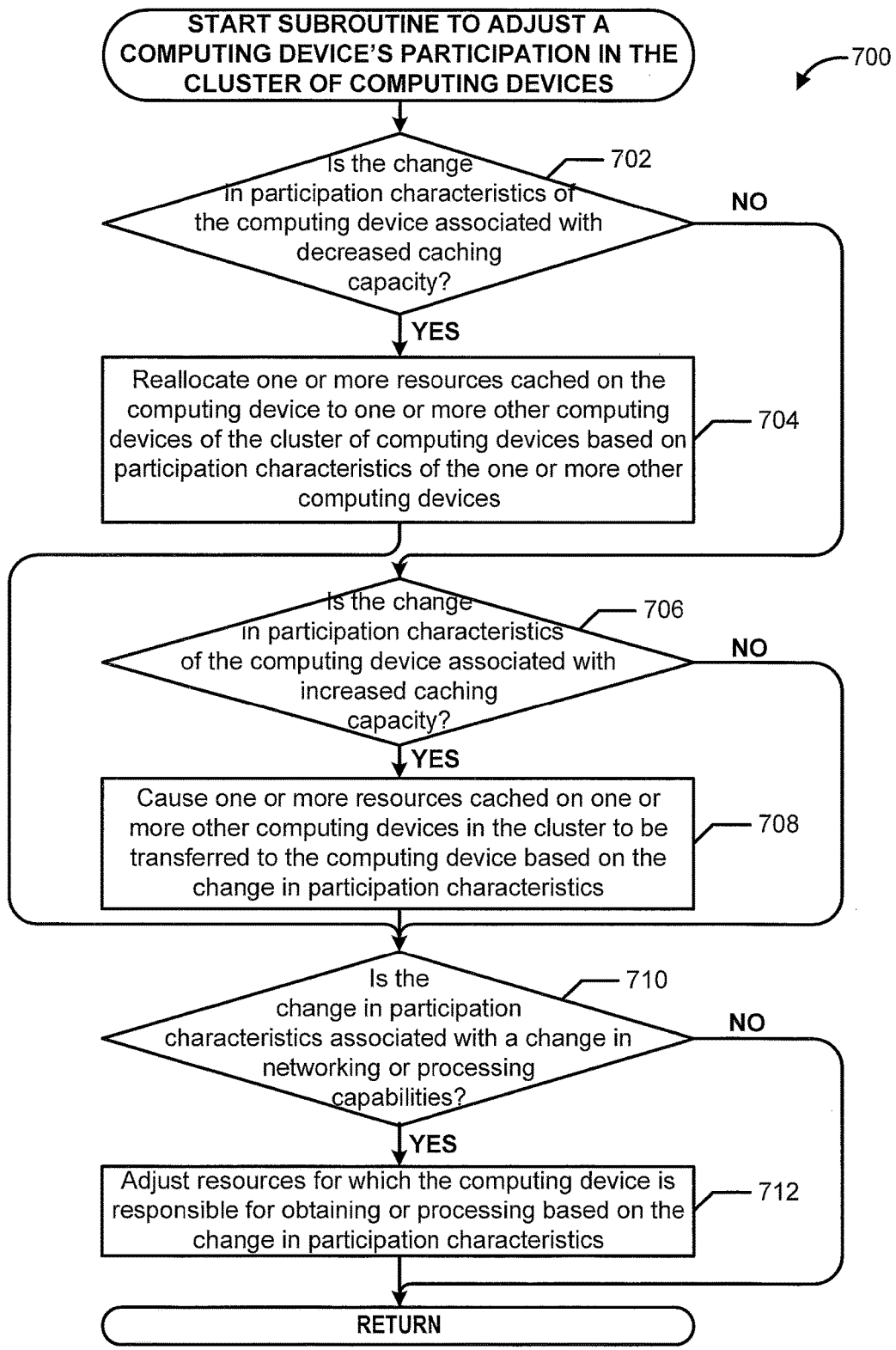
FIG. 7 is a process flow diagram illustrating a computer-implemented method for adjusting the participation of a computing device within a cluster of computing devices, according to some embodiments.

FIG. 7 is a process flow diagram of an illustrative subroutine 700 for adjusting one or more computing devices' participation in the cluster of computing devices, according to some embodiments. The subroutine 700 may be implemented with a cluster participation service operating on a computing device (e.g., the cluster participation service 320 of the computing device 102a as described with reference to FIG. 4). The subroutine 700 implements an embodiment of the operations of block 414 of the routine 400 as described with reference to FIG. 4. As such, the cluster participation service 320 may begin performing the operations of the subroutine 700 in response to determining that participation characteristics of a computing device in the cluster of computing devices has changed (i.e., decision block 412="YES" as discussed with reference to FIG. 4).

In decision block 702, the cluster participation service 320 may determine whether the change in the participation characteristics of the computing device is associated with a decreased caching capacity. In some embodiments, the cluster participation service 320 may monitor for decreased to the overall storing or caching capacity of a computing device in order to determine whether resourced cached on the computing device should be transferred to one or more other computing devices in the cluster. In particular, a decrease in caching capacity, such as below a certain threshold of available memory or space, may indicate that the computing device may no longer store be able to store one or more resources without negatively impacting the normal operations of that computing device. For example, during the course of its normal operations, the computing device may continue to use memory until the amount of available memory on the computing device begins to become exhausted. In some embodiments, the cluster participation service 320 may periodically poll or query the computing device to assess the current caching capacity and may make the determination in decision block 702 based on that received information. Alternatively, or in addition, the cluster participation service 320 may receive unsolicited information from the computing device indicating that the computing device is suffering or about to suffer from low memory due to the resources cached on that computing device.

In response to determining that the change in participation characteristics of the computing device is associated with decreased caching capacity (i.e., decision block 702="YES"), the cluster participation service 320 may reallocate one or more resource cached on the computing device to one or more other computing devices of the cluster of computing devices based on participation characteristics of the one or more other computing devices, at block 704. Particularly, the cluster participation service 320 may determine the current participation characteristics of other computing devices in the cluster in order to identify one or more of those computing devices that may be able to cache resources on the computing device suffering from decreased caching capacity. In some embodiments, the cluster participation service 320 may split the resources between multiple other computing devices in order to distribute the resources more evenly.

Alternatively, in response to determining that the change in participation characteristics of the computing device is not associated with decreased caching capacity (i.e., decision block 702="NO"), the cluster participation service 320 may determine in decision block 706 whether the change in participation characteristics of the computing device is associated with increased caching capacity, in decision block 706. In some embodiments, the operations performed in decision 706 may be similar to those performed in decision block 702. For example, the cluster participation service 320 may similarly analyze the participation characteristics of the computing device to determine whether the computing device has increased its amount of available memory. In response to determining that the change in participation characteristics of the computing device is associated with increased caching capacity (i.e., decision block 706="YES"), the cluster participation service 320 may cause one or more resources cached on one or more other computing devices in the cluster to be transferred to the computing device based on the change in participation characteristics of that computing device. Thus, as discussed above, the cluster participation service 320 may leverage the increase caching capacity of the computing device to more evenly distribute the resourced stored in the cluster of devices.

In addition to causing the one or more resources cached on one or more other computing devices to be transferred to the computing device at block 708—or, alternatively, in response to determining that the change in participation characteristics was not associated with an increased caching capacity in decision block 706 or reallocating resources cached on the computing device at block 704—, the cluster participation service 320 may determine in decision block 710 whether the change in participation characteristics of the computing device is also, or alternatively, associated with a change in networking or processing capabilities. In some embodiments of the operations performed in decision block 710, the cluster participation service 320 may analyze the participation characteristics of the computing device to determine whether the networking or processing capabilities of the computing device have changed. For example, the cluster participation service 320 may determine whether the computing device has begun executing an application that requires substantial processing or networking resources, or on the other hand, whether the cluster participation service 320 has terminated such an application. Simply described, the cluster participation service 320 may determine whether the change in participation characteristics of the computing device indicate that the computing device may take a more active role in the cluster, which may mean that one or more other computing devices may scale back their role, or whether the change indicates that the computing device may need to scale back its role in the cluster, in which case, one or more other computing devices may need to take a more active role in responding to resource requests and/or caching resources. Thus, in response to determining that the change in participation characteristics of the computing device is associated with a change in the computing device's network or processing capabilities (i.e., decision block 710="YES"), the cluster participation service 320 may adjust resources for which the computing device is responsible for obtaining or processing based on the change in the computing device's participation characteristics.

In response to adjusting resources for which the computing device is responsible for obtaining or processing at block 712 or, alternatively, in response to determining that the change in participation characteristics was not associated with a change in the computing device's networking or processing capabilities (i.e., decision block 710="NO"), the cluster participation service 320 may end the subroutine and return to performing operations in the routine 400 as described (e.g., with reference to FIG. 4).

In some embodiments (not shown), the cluster participation service 320 may determine that changes in the participation of its computing device indicate that the computing device may have insufficient resources to serve as the manager device of the cluster. For example, the cluster participation service 320 may determine that the current processing resources of the manager computing device are insufficient to serving as the manager of the cluster of computing devices in addition to performing operations on behalf of a user of the manager computing device. In such embodiments, the cluster participation service 320 may alert other devices in the cluster that its computing device will no longer serve as the managing device. In response, the computing devices in the cluster may elect or appoint another computing device from within the cluster to serve as the manager device.

Figure 8:
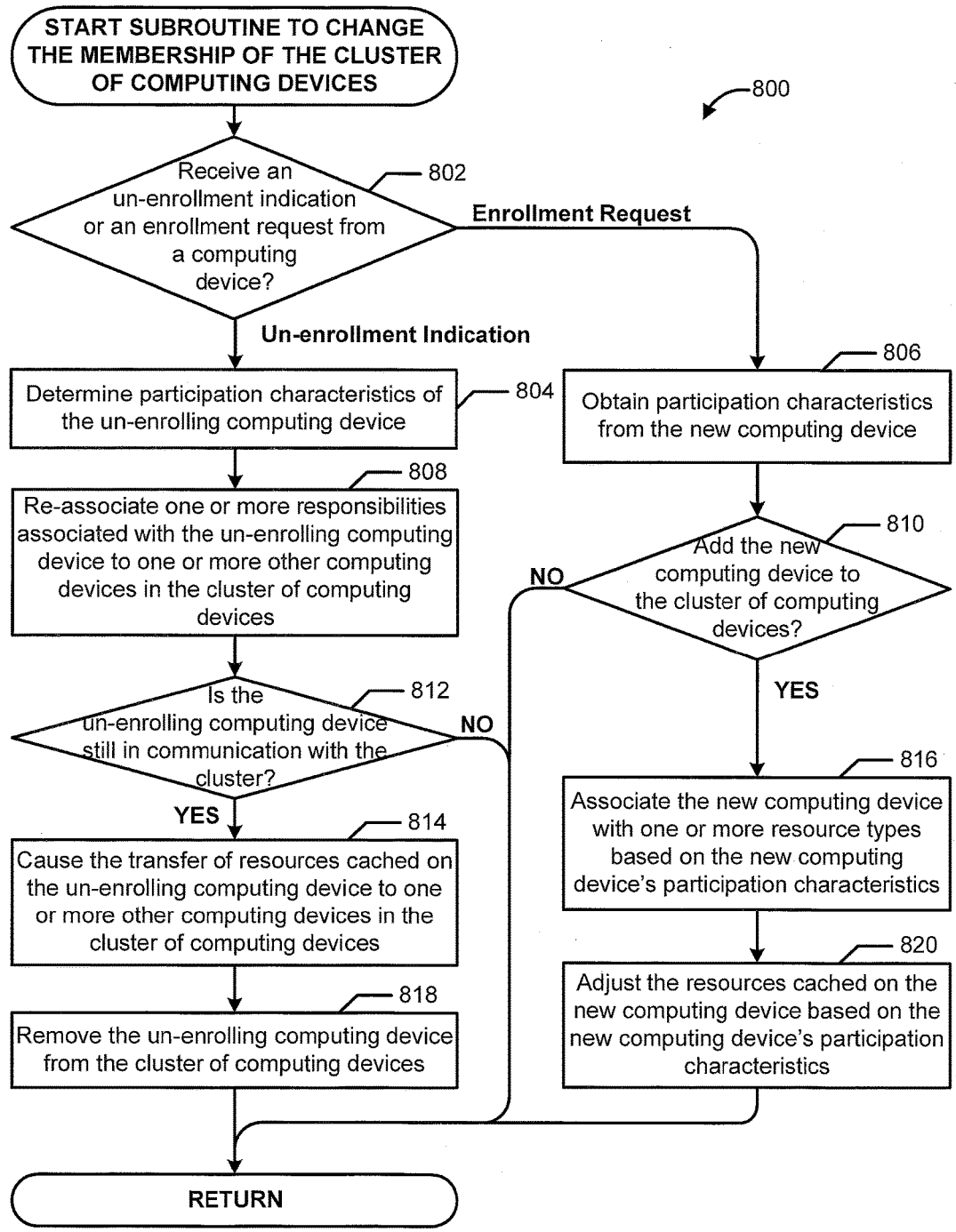
FIG. 8 is a process flow diagram illustrating a computer-implemented method for changing the membership of the cluster of computing devices, according to some embodiments.

FIG. 8 is a process flow diagram of an illustrative subroutine 800 for changing the membership of the cluster of computing devices, according to some embodiments. The subroutine 800 may be implemented with a cluster participation service operating on a computing device (e.g., the cluster participation service 320 of the computing device 102a as described with reference to FIG. 4). The subroutine 800 implements an embodiment of the operations of block 418 of the routine 400 as described with reference to FIG. 4. As such, the cluster participation service 320 may begin performing the operations of the subroutine 800 in response to determining that there has been a change in membership of the cluster of computing devices (i.e., decision block 412="YES" as discussed with reference to FIG. 4).

As discussed (e.g., with reference to FIG. 7), the cluster participation service 320 may monitor for changes to a computing device in the cluster of computing devices in order to determine how to dynamically shift the participation responsibilities of that computing device and possibility other devices in the cluster. For example, the cluster participation service 320 may cause resources cached on a first computing device to be transferred to a second computing device in response to determining that the first computing device has experienced a reduction in overall caching capacity.

Similarly, in some embodiments, the cluster participation service 320 may monitor for changes in the membership of the cluster of computing devices, such as the addition or removal of a computing device from the cluster. In such embodiments, the cluster participation service 320 may dynamically adjust the participation responsibilities of the computing devices in the cluster in reaction to the changes to the membership of the cluster.

Thus, in decision block 802, the cluster participation service 320 may determine whether an un-enrollment indication has been received from a computing device of the cluster of devices or whether an enrollment request has been received from a computing device that is not already a member of the cluster of computing devices. In some embodiments, an "un-enrollment" indication may be a message or other information that a computing device in the cluster of computing device has departed the cluster of computing devices or is about to depart the cluster. In contrast, an "enrollment request" may be a request or other information from a computing device that is not currently a member of the cluster of computing devices that indicated that the computing device is attempting to join the cluster of computing devices.

In response to determining that an un-enrollment indication has been received (i.e., decision block 802="Un-enrollment Indication"), the cluster participation service 320 may determine participation characteristics of the un-enrolling computing device, at block 804. In some embodiments, the cluster participation service 320 may request that the un-enrolling computing device provide current participation characteristics. Alternatively, in the event that the un-enrolling computing device has already departed the cluster (e.g., a sudden power loss), the cluster participation service 320 may retrieve historical participation characteristics of the un-enrolling computing device received at a prior time.

At block 808, the cluster participation service 320 may re-associate or re-assign one or more participation responsibilities that are associated with the un-enrolling computing device to one or more other computing devices in the cluster of computing devices. For example, in the event that the un-enrolling computing device was responsible for obtaining and caching video resources, the cluster participation service 320 may transfer these participation responsibilities to one or more other computing devices remaining in the cluster that may be suited to obtaining and caching video resources. In some examples, these one or more other computing devices may serve as a "fallback" to the un-enrolling computing device.

In decision block 812, the cluster participation service 320 may determine whether the un-enrolling computing device is still in communication with the cluster or whether the un-enrolling computing device is no longer in communication with the cluster of devices. In response to determining that the un-enrolling computing device is still in communication with the cluster (i.e., decision block 812="YES"), the cluster participation service 320 may cause the transfer of resource cached on the un-enrolling computing device to one or more other computing devices in the cluster of computing devices, at block 814. Particularly, because the un-enrolling computing device is about to depart the cluster of computing devices, the cluster participation service 320 may attempt to move the resources cached on the un-enrolling computing device to other computing devices in the cluster in order to keep those resources available on the cluster.

At block 818, the cluster participation service 320 may remove the un-enrolling computing device from the cluster of computing devices.

In response to determining that an enrollment request from a computing device that is not part of the cluster of devices has been received (i.e., decision block 802="Enrollment Request"), the cluster participation service 320 may obtain participation characteristics from the new computing device, at block 806. In decision block 810, the cluster participation service 320 may determine whether to add the new computing device to the cluster of computing devices, at block 810. For example, the cluster participation service 320 may determine whether the particular capabilities of the new computing device may be useful to obtaining and caching resources. In some embodiments, the cluster participation service 320 may implement an exclusion policy that prevents computing devices having certain participation characteristics from participating in the cluster of devices. For example, computing devices that access the network via a data plan (e.g., a cellular connection with limited data) may be excluded in order to prevent those devices from incurring large expenses by obtaining resources on behalf of other devices.

In response to determining to add the new computing device to the cluster of computing devices (i.e., decision block 810="YES"), the cluster participation service 320, at block 816, may associated the new computing device with one or more participation responsibilities based on the participation characteristics obtained from the new computing device at block 806. Further, at block 820, the cluster participation service 320 may adjust the resources cached on the new computing device based on the new computing device's participation characteristics. For example, the cluster participation service 320 may reallocate resources among the computing devices in the cluster to distribute the loads handled by individual computing devices.

In response to removing the un-enrolling computing device from the cluster of computing devices at block 818, determining that the un-enrolling computing device is no longer in communication with the cluster of devices in decision block 812, determining not to add the new computing device to the cluster of computing devices in decision block 810, or adjusting the resources cached on the new computing device at block 820, the cluster participation service 320 may end the subroutine and return to performing operations in the routine 400 as described (e.g., with reference to FIG. 4).

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    a manager computing device comprising:
        a memory; and
        a processor coupled to the memory and configured with processor-executable instructions to perform operations comprising:
            determining participation characteristics of the manager computing device;
            determining to participate in a cluster of computing devices based at least in part on the participation characteristics of the manager computing device;
            discovering a plurality of other computing devices;
            sending the participation characteristics of the manager computing device to the plurality of other computing devices;
            receiving participation characteristics from one or more of the plurality of other computing devices; and
            forming a cluster of computing devices with the one or more of the plurality of other computing devices, wherein the cluster of computing devices appoints the manager computing device as a manager of the cluster of computing devices based at least in part on the participation characteristics of the manager computing device and the participation characteristics of the one or more other computing devices.

2. The system of claim 1, wherein the participation characteristics of the manager computing device comprise information related to at least one of: capabilities of the manager computing device, a cluster enrollment policy of the manager computing device, an access control policy of the manager computing device, an amount of available space in a cache of the manager computing device, an available network bandwidth of the manager computing device, an amount of available processing resources on the manager computing device, information regarding applications executing or available for execution on the manager computing device, information regarding user engagement of the manager computing device, a schedule of future operations that the manager computing device is expected to perform, a history of operations that the manager computing device previously performed, a history of user interaction with the manager computing device, or a sensor measurement of the manager computing device.

3. The system of claim 1, wherein the processor executes processor-executable instructions to perform operations further comprising voting to elect a manager from among the manager computing device and the one or more of the plurality of computing devices based at least in part on the participation characteristics of the manager computing device and the participation characteristics received from the one or more of the plurality of other computing devices.

4. The system of claim 1, wherein the processor executes processor-executable instructions to perform operations further comprising:
    receiving a resource request from a requesting computing device;
    determining that the resource is not cached on any computing device in the cluster of computing devices;
    polling the cluster of computing devices for information regarding a capacity to obtain the requested resource from a resource provider;
    determining, from among the cluster of computing devices, a computing device having a highest capacity to obtain the requested resource;
    causing the computing device determined to have the highest capacity to obtain the requested resource from the resource provider; and
    providing the requested resource to the requesting computing device.

5. The system of claim 4, wherein the processor executes processor-executable instructions to perform operations such that determining, from among the cluster of computing devices, a computing device having a highest capacity to obtain the requested resource comprises:
    determining characteristics of the requesting computing device; and
    determining the computing device having the highest capacity to obtain the requested resource based at least in part on the characteristics of the requesting computing device.

6. The system of claim 4, wherein the processor executes processor-executable instructions to perform operations further comprising:
    polling the cluster of computing devices for information regarding capacities of the cluster of computing devices to cache the requested resource;
    identifying, from the cluster of computing devices, a computing device having a highest capacity to cache the requested resource; and
    causing the identified computing device to cache the received requested resource.

7. A method for managing a cluster of computing devices, the method comprising:
    determining for a manager computing device to participate in a cluster based at least in part on participation characteristics of the manager computing device;
    determining participation characteristics of a plurality of other computing devices;
    forming the cluster of computing devices comprising the manager computing device and one or more of the other computing devices;
    determining at least one participation responsibility for a computing device of the cluster of computing devices based at least in part on participation characteristics of the computing device, the participation responsibility associated with providing a network resource to at least one computing device in the cluster of computing devices;
    assigning the at least one participation responsibility to the computing device;
    determining a change in participation characteristics of the computing device; and adjusting a participation responsibility associated with at least one of the computing devices of the cluster of computing devices based at least in part on the change in participation characteristics of the computing device.

8. The method of claim 7, wherein participation responsibilities comprises at least one of retrieving network resources from a resource provider, caching an amount of network resources, caching network resources, responding to network resource requests from a requesting computing device.

9. The method of claim 7, wherein participation responsibilities comprise conditions of participation of the computing device in the cluster of computing devices.

10. The method of claim 7, wherein determining at least one participation responsibility for the computing device is further based on participation characteristics of another computing device of the cluster of computing devices.

11. The method of claim 7, wherein determining the change in participation characteristics of the computing device of the cluster of computing devices comprises:
polling the computing device for current participation characteristics;
performing a comparison of the current participation characteristics of the computing device with previous participation characteristics of the computing device; and
determining the change in participation characteristics of the computing device based on the comparison.

12. The method of claim 7, wherein determining the change in participation characteristics of the computing device of the cluster of computing devices comprises determining that a caching capacity of the computing device has increased and wherein adjusting the participation responsibility of the at least one computing device comprises reallocating one or more resources cached on the at least one computing device to the computing device.

13. The method of claim 7, wherein determining the change in participation characteristics of the computing device of the cluster of computing devices comprises determining that a caching capacity of the computing device has decreased and wherein adjusting the participation responsibility of the at least one computing device of the cluster of computing devices comprises transferring one or more resources cached on the computing device to the at least one computing device.

14. The method of claim 13 further comprising determining that the at least one computing device is capable of storing the one or more resources cached on the computing device based on participation characteristics of the at least one computing device.

15. The method of claim 7 further comprising, for computing devices within the cluster of computing devices, associating the computing devices with one or more resource types based on participation characteristics.

16. The method of claim 15, wherein adjusting the participation responsibility of the at least one computing device comprises:
de-associating one or more resource types associated with the computing device based at least in part on the change in the participation characteristics of the computing device; and
associating the one or more resource types with the at least one computing device based on participation characteristics of the at least one computing device.

17. The method of claim 16 further comprising:
determining that the change in the participation characteristics of the computing device is associated with a loss of support for the one or more resource types; and
determining that the participation characteristics of the at least one computing device indicate support for the one or more resource types.

18. The method of claim 7, further comprising:
determining that a manager device of the cluster of computing devices has un-enrolled from the cluster of computing devices; and
electing a new manager device of the cluster of computing devices.

19. The method of claim 18, further comprising determining, by the new manager device, at least one participation responsibility for remaining computing devices of the cluster of computing devices based on participation characteristics of the remaining computing devices.

20. A non-transitory, computer-readable medium having stored thereon computer-executable software instructions that, when executed by a processor of a manager computing device of a cluster of computing devices, cause the processor of the manager computing device to perform operations comprising:
determining to participate in a cluster of computing devices based at least in part on participation characteristics of the manager computing device;
determining participation characteristics of a plurality of other computing devices;
forming the cluster of computing devices comprising the manager computing device and one or more of the other computing devices;
determining participation responsibilities for computing devices of the cluster of computing devices based on the participation characteristics of the computing devices; and
assigning the participation responsibilities to the computing devices, the participation responsibilities associated with making network resources available to the cluster of computing devices.

21. The non-transitory computer-readable storage medium of claim 20, wherein the stored computer-executable software instructions, when executed by the processor of the manager computing device, cause the processor of the manager computing device to perform operations further comprising:
receiving, from a new computing device, a request to enroll in the cluster of computing devices; and
obtaining participation characteristics from the new computing device.

22. The non-transitory computer-readable storage medium of claim 20, wherein the stored computer-executable software instructions, when executed by the processor of the manager computing device, cause the processor of the manager computing device to perform operations further comprising determining to reject the request of the new computing device based on at least one of the participation characteristics of the new computing device and the participation characteristics of the computing devices of the cluster of computing devices.

23. The non-transitory computer-readable storage medium of claim 20, wherein the stored computer-executable software instructions, when executed by the processor of the manager computing device, cause the processor of the manager computing device to perform operations further comprising:

determining to enroll the new computing device in the cluster of computing devices based on at least one of the participation characteristics of the new computing device and the participation characteristics of the computing devices of the cluster of computing devices;

determining at least one participation responsibility for the new computing device based on at least one of the participation characteristics of the new computing device and the participation characteristics of the computing devices of the cluster of computing devices; and assigning, to the new computing device, the at least one participation responsibility determined for the new computing device.

24. The non-transitory computer-readable storage medium of claim 23, wherein the stored computer-executable software instructions, when executed by the processor of the manager computing device, cause the processor of the manager computing device to perform operations further comprising adjusting a participation responsibility of at least one of the computing devices of the cluster of computing devices based on at least one participation responsibility assigned to the new computing device.

25. The non-transitory computer-readable storage medium of claim 20, wherein the stored computer-executable software instructions, when executed by the processor of the manager computing device, cause the processor of the manager computing device to perform operations further comprising:

determining that a computing device of the cluster of computing devices is or is about to un-enroll from the cluster of computing devices;

determining one or more participation responsibilities associated with the un-enrolling computing device of the cluster of computing devices;

re-associating the one or more of participation responsibilities of the un-enrolling computing device to at least one other computing device of the cluster of computing devices based at least in part on participation characteristics of the at least one other computing device; and removing the un-enrolling computing device from the cluster of computing devices.

26. The non-transitory computer-readable storage medium of claim 25, wherein the stored computer-executable software instructions, when executed by the processor of the manager computing device, cause the processor of the manager computing device to perform operations such that determining that a computing device of the cluster of computing devices is or is about to un-enroll from the cluster of computing devices comprises receiving an un-enrollment indication from the un-enrolling computing device.

27. The non-transitory computer-readable storage medium of claim 25, wherein the stored computer-executable software instructions, when executed by the processor of the manager computing device, cause the processor of the manager computing device to perform operations such that determining that a computing device of the cluster of computing devices is or is about to un-enroll from the cluster of computing devices comprises determining that the un-enrolling computing device is no longer in communication with any computing device of the cluster of computing devices.

28. The non-transitory computer-readable storage medium of claim 25, wherein the stored computer-executable software instructions, when executed by the processor of the manager computing device, cause the processor of the manager computing device to perform operations further comprising, prior to removing the un-enrolling computing device from the cluster of computing devices:

determining one or more resources cached on the un-enrolling computing device; and transferring the one or more resources cached on the un-enrolling computing device to at least one other computing device of the cluster of computing devices.

29. The non-transitory computer-readable storage medium of claim 20, wherein the stored computer-executable software instructions, when executed by the processor of the manager computing device, cause the processor of the manager computing device to perform operations further comprising:

determining participation characteristics of the manager computing device;

determining to un-enroll from the cluster of computing devices based on the participation characteristics of the manager computing device; and sending an un-enrollment indication to one or more of the cluster of computing devices.

30. The non-transitory computer-readable storage medium of claim 20, wherein the stored computer-executable software instructions, when executed by the processor of the manager computing device, cause the processor of the manager computing device to perform operations further comprising:

determining participation characteristics of the manager computing device;

determining to cease managing the cluster of computing devices; and sending a notification to one or more computing devices of the cluster of computing devices, wherein the notification causes the cluster of computing devices to appoint a new manager computing device.

* * * * *